(12) United States Patent
Minamidate et al.

(10) Patent No.: US 10,843,497 B2
(45) Date of Patent: Nov. 24, 2020

(54) PLATE WITH PRINTED LAYER, MANUFACTURING METHOD THEREOF, AND DISPLAY DEVICE

(71) Applicant: AGC Inc., Chiyoda-ku (JP)

(72) Inventors: Jun Minamidate, Tokyo (JP); Toru Ikeda, Tokyo (JP); Yosuke Takeda, Tokyo (JP); Azusa Takai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 566 days.

(21) Appl. No.: 15/608,388

(22) Filed: May 30, 2017

(65) Prior Publication Data

US 2017/0341451 A1    Nov. 30, 2017

(30) Foreign Application Priority Data

May 30, 2016   (JP) ................................. 2016-107709

(51) Int. Cl.
| | |
|---|---|
| *B32B 3/10* | (2006.01) |
| *B41N 1/22* | (2006.01) |
| *B32B 5/14* | (2006.01) |
| *B32B 7/02* | (2019.01) |
| *B32B 17/10* | (2006.01) |

(52) U.S. Cl.
CPC ............... *B41N 1/22* (2013.01); *B32B 5/142* (2013.01); *B32B 7/02* (2013.01); *B32B 17/10458* (2013.01); *B32B 2457/202* (2013.01); *B32B 2457/208* (2013.01)

(58) Field of Classification Search
None
See application file for complete search history.

(56) References Cited

U.S. PATENT DOCUMENTS

| | | | |
|---|---|---|---|
| 6,041,702 A | 3/2000 | Ichikawa et al. | |
| 8,561,535 B2 | 10/2013 | Sabia et al. | |
| 2010/0246016 A1* | 9/2010 | Carlson | ................... C03C 15/00 359/599 |
| 2013/0323444 A1* | 12/2013 | Ehemann | ................... C03C 4/18 428/34.4 |

FOREIGN PATENT DOCUMENTS

| | | |
|---|---|---|
| CN | 207291374 U | 5/2018 |
| JP | 3677150 | 7/2005 |

\* cited by examiner

*Primary Examiner* — Christopher M Polley
(74) *Attorney, Agent, or Firm* — Oblon, McClelland, Maier & Neustadt, L.L.P.

(57) ABSTRACT

The present invention relates to a plate with a printed layer containing: a bent plate with a bent portion, including a first main surface, a second main surface and an end surface, and a printed layer formed on the first main surface, in which the printed layer has an average value (average OD value) of optical density (OD values) in visible light in a plane being 4 or more.

31 Claims, 10 Drawing Sheets

$\alpha + \beta + \gamma > 180°$ $\alpha + \beta + \gamma < 180°$

PLATE WITH PRINTED LAYER, MANUFACTURING METHOD THEREOF, AND DISPLAY DEVICE

TECHNICAL FIELD

The present invention relates to a plate with a printed layer, a manufacturing method thereof, and a display device including a plate with a printed layer.

BACKGROUND ART

A technology of performing screen printing on a bent base material with a curved surface shape has been known (see Patent Documents 1 and 2, etc.). Patent Document 1 discloses a printing method of using a screen in accordance with a shape of a surface to be printed having a curved surface shape, and wiping the screen with a squeegee while pressing the screen against the surface to be printed. Also, Patent Document 2 discloses a curved-surface screen printing device in which a screen is driven to rotate in accordance with a curvature of a surface to be printed such that the screen constantly faces a tangential direction with respect to the surface to be printed.

Patent Document 1: U.S. Pat. No. 8,561,535
Patent Document 2: Japanese Patent No. 3677150

SUMMARY OF THE INVENTION

In the aforementioned printing method disclosed in Patent Documents 1 and 2, a flat screen is used. Therefore, the screen does not reach the surface to be printed of an article with a bending depth that is equal to or greater than a pressing limit amount from the flat surface, and it is difficult to perform printing. Even when printing can be performed, the thickness of the printing varies and "optical density" indicating a hiding performance tends to vary. Also, since the flat screen is used, in the case of an article having both a protruding portion and a recessed portion on a surface to be printed, there is a case where the protruding portion interferes with the screen during printing of the recessed portion, which also makes it impossible to perform printing.

An object of the present invention is to provide a manufacturing method capable of manufacturing a plate with a printed layer that has an excellent appearance and has a uniform and excellent hiding performance in a plane, a plate with a printed layer that has an excellent appearance and has a uniform and excellent hiding performance in a plane, and a display device including the same.

The above object of the present invention is achieved by the following configurations.

[1] A plate with a printed layer containing:

a bent plate with a bent portion, including a first main surface, a second main surface and an end surface, and a printed layer formed on the first main surface, in which the printed layer has an average value (average OD value) of optical density (OD values) in visible light in a plane being 4 or more.

[2] The plate with a printed layer according to [1], in which the printed layer has an in-plane distribution of the OD value being within a range of the average OD value ±30%.

[3] A plate with a printed layer containing:

a bent plate with a bent portion, including a first main surface, a second main surface and an end surface, and a printed layer formed on the first main surface, in which the printed layer has an undulation in its surface, and the undulation has a diameter (true-circle equivalent) of a cross section at a height of a bearing height +0.05 μm being larger than 10 μm and 185 μm or smaller, and has a maximum height being from 0.2 μm to 10 μm when the height at a portion having the lowest height in an observation region is taken as a basis.

[4] The plate with a printed layer according to any one of [1] to [3], in which the bent plate has a relative permittivity of 10 or lower.

[5] The plate with a printed layer according to any one of [1] to [4], in which the bent plate has a volume resistivity value of $2 \times 10^5$ Ωm or larger at 20° C.

[6] The plate with a printed layer according to any one of [1] to [5], in which the bent portion has a curvature radius of 1,000 mm or smaller.

[7] The plate with a printed layer according to any one of [1] to [6], in which the printed layer is also formed on the end surface.

[8] The plate with a printed layer according to any one of [1] to [7], in which the second main surface is subjected to a surface treatment.

[9] The plate with a printed layer according to [8], in which the surface treatment is at least one treatment selected from the group consisting of antiglare treatment, antireflection treatment, antifouling treatment, and antifogging treatment.

[10] The plate with a printed layer according to any one of [1] to [9], in which a material of the bent plate is glass.

[11] The plate with a printed layer according to [10], in which the glass has a compression stress layer on any one of main surfaces thereof.

[12] The plate with a printed layer according to [11], in which the compression stress layer has a depth (DOL) of 10 μm or larger.

[13] The plate with a printed layer according to any one of [10] to [12], in which the glass has a composition containing, represented by mol % on the basis of oxides:

50 to 80% of $SiO_2$,
0.1 to 25% of $Al_2O_3$,
3 to 30% of $Li_2O+Na_2O+K_2O$,
0 to 25% of MgO,
0 to 25% of CaO, and
0 to 5% of $ZrO_2$.

[14] The plate with a printed layer according to any one of [1] to [13], in which the bent plate further includes a flat portion.

[15] The plate with a printed layer according to any one of [1] to [14], in which in a cross-sectional view in a thickness direction of the bent plate, when a distance between a line segment connecting two end portions and a tangential line that is in contact with the bent portion and in parallel with the line segment is defined as a bending depth h, the bending depth is 1,000 mm or smaller.

[16] The plate with a printed layer according to any one of [1] to [15],
in which the bent plate has a twisted structure with different curvature radii in a single bent portion.
[17] The plate with a printed layer according to any one of [1] to [16],
in which the printed layer has a thickness of 3 μm or larger.
[18] The plate with a printed layer according to any one of [1] to [17],
in which the printed layer has a thickness of 10 μm or smaller.
[19] The plate with a printed layer according to any one of [1] to [18],
in which the printed layer has a thickness being within a range of an average thickness ±30%.
[20] The plate with a printed layer according to any one of [14] to [19],
in which the first main surface further includes a non-printed portion with no printed layer formed thereon, and the non-printed portion has a ratio of a reflected image diffusion index value Rr obtained by Equation (1) being from 0.3 to 0.8:

Ratio of reflected image diffusion index value $Rr$= (reflected image diffusion index value $Rr$ in non-printed layer portion of bent portion)/(sum of reflected image diffusion index values $Rr$ in respective non-printed layer portions in flat portion and bent portion)      (1).

[21] A display device containing the plate with a printed layer described in any one of [1] to [20].
[22] A method for manufacturing a plate with a printed layer containing:
a coating film formation step of forming a coating film on a non-conductive plate including a first main surface, a second main surface and an end surface, by applying a coating solution containing a printing material to the first main surface by using electrostatic power,
in which in the coating film formation step, the non-conductive plate is in contact with a conductive base material and the coating solution has a viscosity of 0.1 Pa·s or less.
[23] The method for manufacturing a plate with a printed layer according to [22],
in which the coating solution has a surface tension of from 0.01 N/m to 0.1 N/m.
[24] The method for manufacturing a plate with a printed layer according to [22] or [23],
in which an electrostatic coating apparatus is used in the coating film formation step.
[25] The method for manufacturing a plate with a printed layer according to any one of [22] to [24], further containing:
a coating film stabilization step of stabilizing the coating film.
[26] The method for manufacturing a plate with a printed layer according to any one of [22] to [25], further containing:
a masking formation step of forming masking on the non-conductive plate.
[27] The method for manufacturing a plate with a printed layer according [24],
in which the electrostatic coating apparatus has an electrostatic coating gun.
[28] The method for manufacturing a plate with a printed layer according to any one of [22] to [27],
in which the non-conductive plate is glass.
[29] The method for manufacturing a plate with a printed layer according to any one of [22] to [28],
in which the non-conductive plate includes a bent portion.
[30] The method for manufacturing a plate with a printed layer according to any one of [22] to [29],
in which the conductive base material has a conductivity imparted at least to a surface thereof, and the surface is in contact with the second main surface of the non-conductive plate.
[31] A display device containing a plate with a printed layer obtained by the method for manufacturing a plate with a printed layer described in any one of [22] to [30].

According to the present invention, it is possible to provide a manufacturing method capable of manufacturing a plate with a printed layer that has an excellent appearance and has a uniform and excellent hiding performance in a plane, a plate with a printed layer that has an excellent appearance and has a uniform and excellent hiding performance in a plane, and a display device including the same.

BRIEF DESCRIPTION OF THE DRAWINGS

Each of FIG. 1A
FIG. 2B is an example having a shape formed only of a bent portion.
FIG. 5A is a schematic perspective view,
and FIG. 5B is a schematic cross-sectional view taken along A-A' of FIG. 5A.
Each of FIG. 6A, FIG. 6B
FIG. 7A is a state where a Gaussian curvature is a positive value,
FIG. 7B is a state where the Gaussian curvature is a negative value,
and FIG. 7C is a state where the Gaussian curvature is zero.
FIG. 8A is a spherical surface,
and FIG. 8B is a saddle surface.

MODE FOR CARRYING OUT THE INVENTION

Definitions of the following terms will be applied to the specification and the scope of claims.
The "flat portion" means a portion with an average curvature radius of larger than 1,000 mm.

The "bent portion" means a portion with an average curvature radius of 1,000 mm or smaller.

Figure 5A:
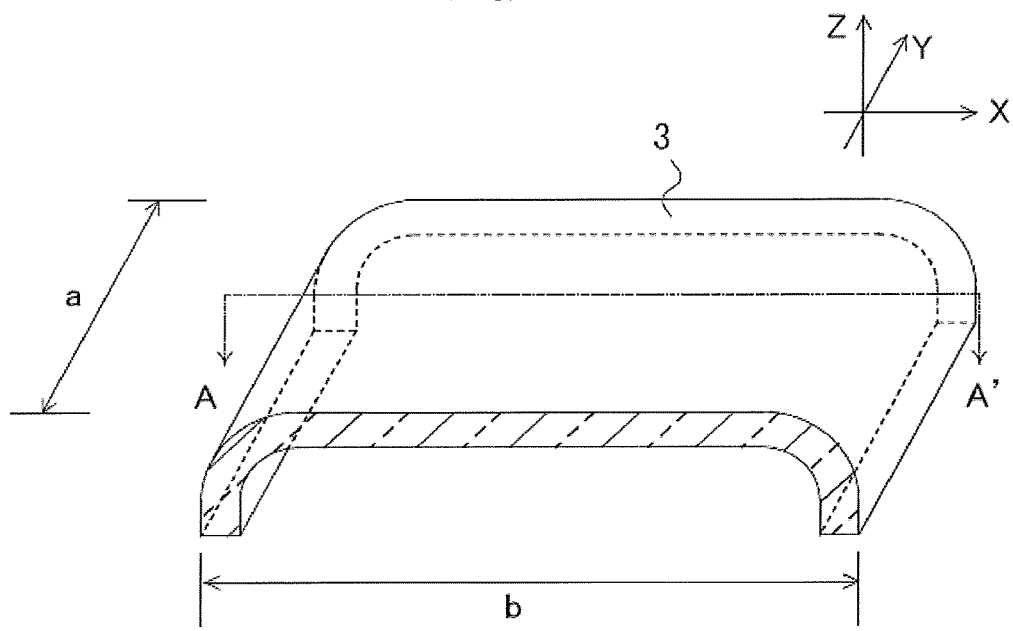
FIG. 5A and FIG. 5B are explanatory diagrams of the respective sites of a bent plate (non-conductive plate) with a bent portion, where

As for the "bending depth", in a cross-sectional view in a thickness direction of a bent plate, the distance between a line segment connecting two end portions and a tangential line that is in contact with a bent portion of a bent base material and in parallel with the line segment is defined as the "bending depth h". This means the distance h between both ends of a plate 3 (hereinafter, referred to as a bent plate 3 (non-conductive plate)) in a bending direction (the Z direction in FIG. 5B) of the bent plate 3 (non-conductive plate) with a bent portion as illustrated in FIG. 5A and FIG. 5B.

Figure 5B:
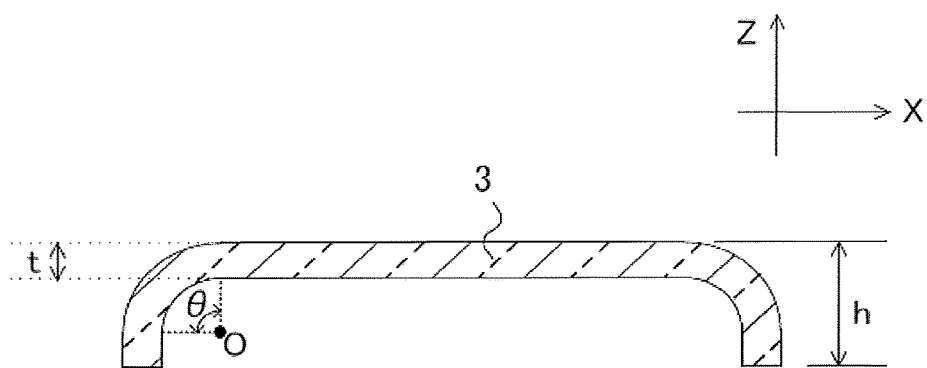

The "bending angle" represents an angle θ formed by connecting both ends of the bent portion and the center O of the curvature radius in a cross-sectional view in the thickness direction as illustrated in FIG. 5B. Although the bent portion with a constant curvature radius is exemplified in the description, a bent portion with a continuously changing curvature radius may also be employed. In such a case, the center O of the curvature radius may be the center of an average curvature radius of a maximum value and a minimum value of curvature radii.

Figure 7A:
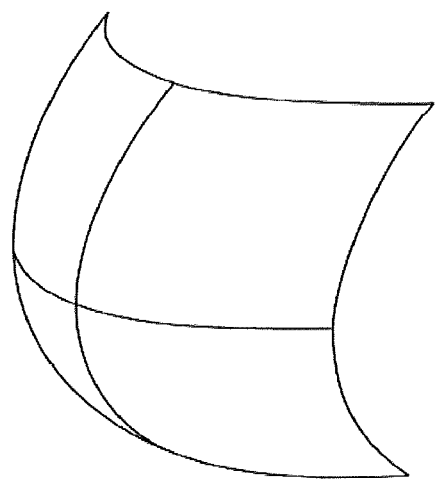
FIG. 7A, FIG. 7B and FIG. 7C are perspective views of a curved surface of a bent plate, where
Figure 7B:
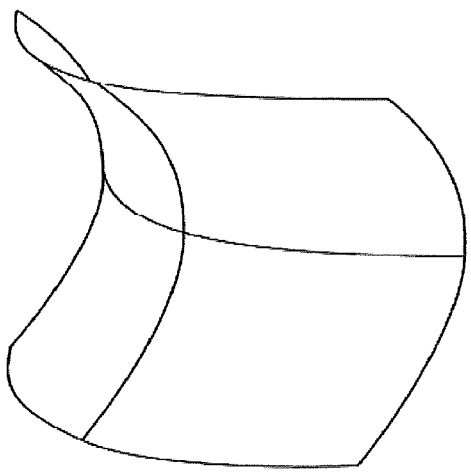
Figure 7C:
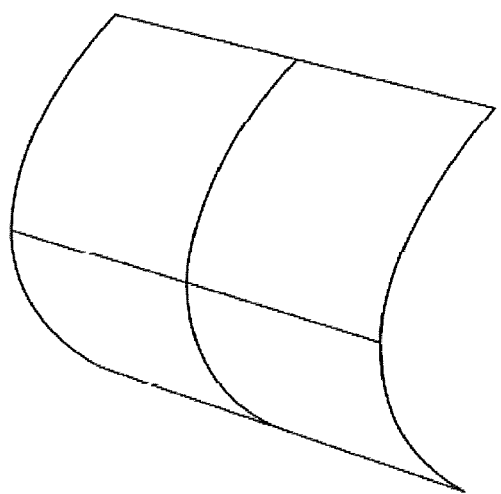
Figure 8A:
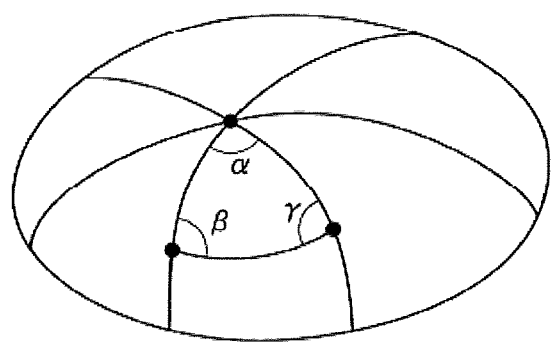
FIG. 8A and FIG. 8B are perspective views of the curved surface of the bent plate, where
Figure 8B:
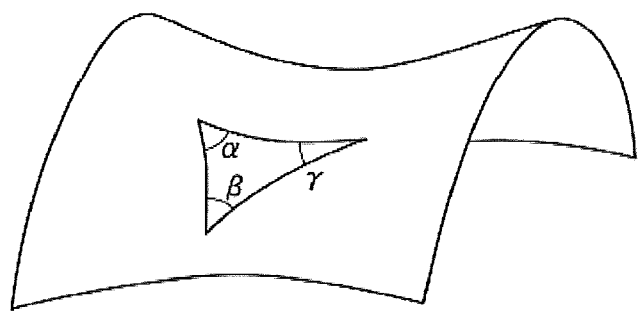

The "Gaussian curvature" is a physical index value representing how a plane is inclined with respect to a flat plane. For simple mathematical derivation of the Gaussian curvature, Gaussian curvature K of a plane is defined as a product of main curvatures k1 and k2 of a plane at a certain spot on the plane, and $K=k1 \times k2$. If the Gaussian curvature K of a plane is a positive value, for example, the plane has a bump or a peak at the spot as illustrated in FIG. 7A. If the Gaussian curvature K of a plane is a negative value, the plane has a saddle point as illustrated in FIG. 7B. If the Gaussian curvature K of a plane is zero, the plane is equivalent to a flat surface at the site as illustrated in FIG. 7C. As illustrated in FIG. 8A, a sum ($\alpha+\beta+\gamma$) of interior angles of a triangle depicted on a plane with a positive Gaussian curvature (e.g., a spherical surface) is larger than 180°. As illustrated in FIG. 8B, a sum ($\alpha+\beta+\gamma$) of interior angles of a triangle depicted on a plane with a negative Gaussian curvature (e.g., a saddle surface) is smaller than 180°. Also, a sum ($\alpha+\beta+\gamma$) of interior angles of a triangle depicted on a plane with a Gaussian curvature of zero (e.g., a side surface of a cylindrical column) is 180°.

Figure 9:
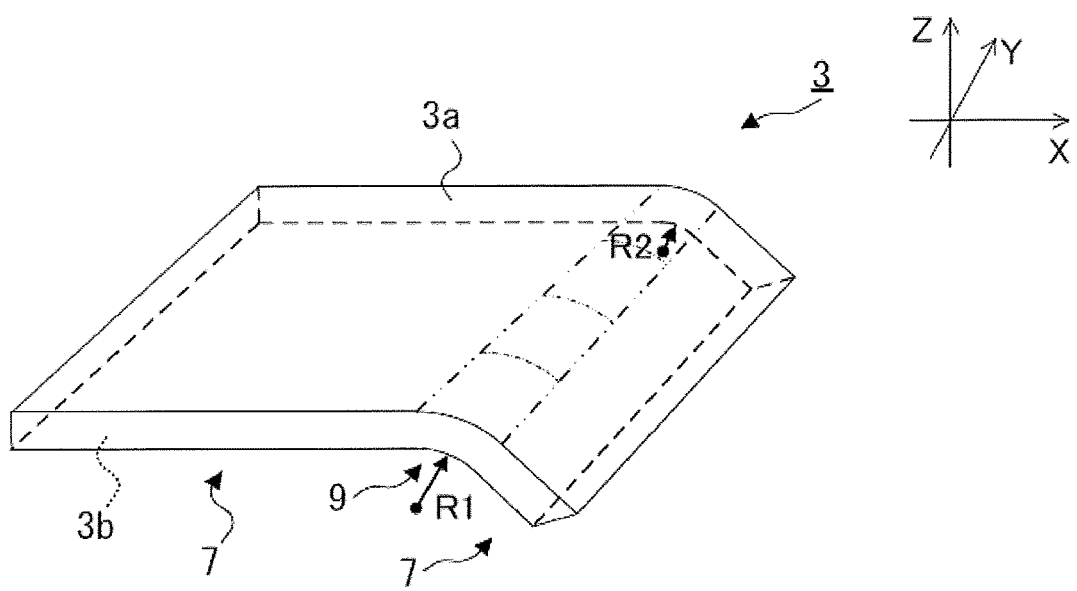
FIG. 9 is an explanatory diagram of a bent plate with a twisted structure.

The "twisted structure" is a structure with a twisted surface and corresponds to the bent plate 3 that has a bent portion 9 as illustrated in FIG. 9. If attention is paid to a second main surface 3b, the bent portion 9 has a curved shape with a curvature radius R1 on the front side of the drawing, which corresponds to an end portion in the Y direction, and has a curved shape with a curvature radius R2 that is smaller than the curvature radius R1 on the further side of the drawing, which corresponds to the other end portion in the Y direction. The bent portion 9 has a curvature radius that continuously changes in the Y direction. Although the bent plate 3 with a flat portion 7 is illustrated in FIG. 9, the bent portion 9 may be connected to another bent portion. The shape of the flat portion may be a rectangular shape, a semicircular shape, or a polygonal shape.

The "arithmetic average roughness Ra" can be measured by the method described in JIS B0601:2001 (ISO4287: 1997).

The "bearing height" is a value of the most predominant height z in a height distribution histogram that is obtained from xyz data of a surface shape of a region of from 101 µm×135 µm to 111 µm×148 µm (hereinafter, also referred to as an "observation region") acquired by performing measurement on the observation region with a laser microscope. The height z in the xyz data is a height with reference to the lowest point in the observation region (the length of a normal drawing from the position at which the height z is measured to a plane that is in parallel with a main surface of a measurement target in the observation region and includes the lowest point), and the same shall apply to meaning of a height in a surface shape in a case where reference is not particularly defined in the following description. A pitch (bin) of the histogram for calculating the bearing height is set to 1,000.

The "reflected image diffusion index value Rr" can be calculated by the method described below. First, a surface of a measurement target is taken as a basis (0°), the measurement target is irradiated with light in a direction of +45° with reference to the basis, and luminance of positively reflected light (referred to as 45° positively reflected light) reflected by the surface of the measurement target is measured. Next, the measurement target is similarly irradiated with light in a direction of +45°, and luminance of entire light reflected by the surface of the measurement target is measured while a light receiving angle is changed within a range of from 0° to +90°. The reflected image diffusion index value Rr is obtained by substituting these measurement values into the equation of:

Reflected image diffusion index value $Rr$=(luminance of entire reflected light−luminance of 45° positively reflected light)/(luminance of entire reflected light).

The "resolution index value T" can be calculated by the method described below. First light is emitted in a direction (referred to as a direction of an angle 0°) in parallel with a thickness direction of a measurement target, which has a first main surface and a second main surface, from the side of the second main surface of the measurement target, and luminance of transmitted light (referred to as 0° transmitted light) transmitted from the first main surface is measured. Next, a light receiving angle with respect to the first main surface is changed within a range of from −90° to +90°, and luminance of the entire transmitted light of the first light transmitted from the side of the first main surface is measured. The resolution index value T is obtained by substituting the measurement values into the equation of:

Resolution index value $T$=(luminance of entire transmitted light−luminance of 0° transmitted light)/ (luminance of entire transmitted light).

The "sparkle index value S" can be obtained as follows. A measurement target, which as a first main surface and a second main surface, is arranged so that the second main surface is located on a side of a display surface of a desired display device. Next, the measurement target is imaged from the side of the first main surface to obtain an image. The image is analyzed by software (manufactured by T System, Co., Ltd.; product name: EyeScale-4W), and a value of ISC-A output therefrom is regarded as the sparkle index value S. In the present application, an iPhone4 manufactured by Apple Incorporated is used as the display device.

The "optical density (OD value)" is an absolute value of a value representing, with a common logarithm with the bottom of 10, a ratio of an amount of transmitted light Ta transmitted through a measurement target with respect to an amount I of specific incident light, and the OD value represents a hiding performance. For example, if it is assumed that the amount I of specific incident visible light with a wavelength of from 360 to 830 nm is 1,000 and the amount Ta of transmitted light is 1, the OD value at this time is |$\text{Log}_{10}(1/1000)$|=3. The OD value can be measured by using a glass substrate transmittance/reflectance measurement unit (manufactured by Lambda Vision Inc.; product name: LV-RTM).

Figure 1A:
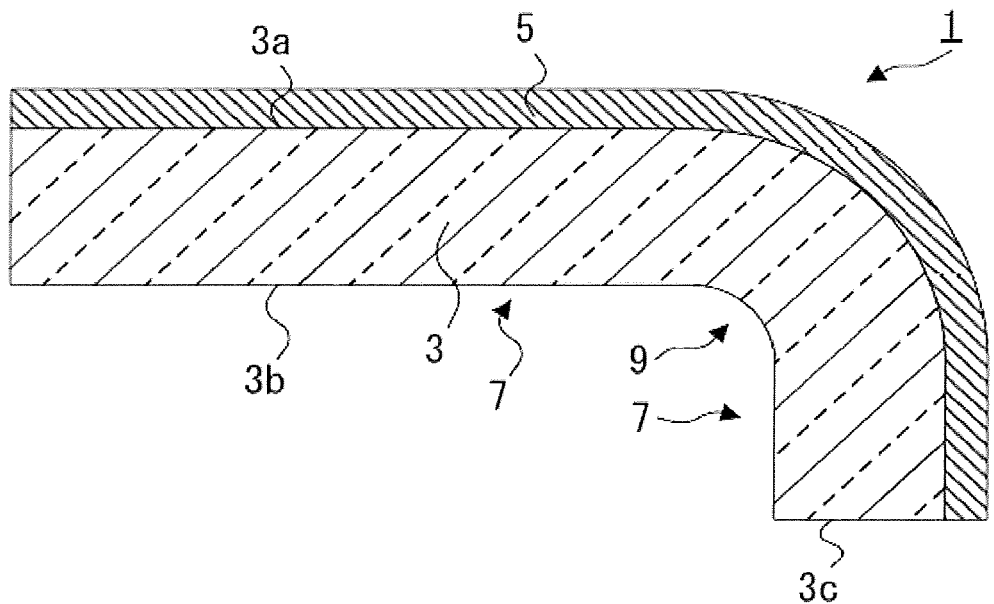
FIG. 1B is a schematic cross-sectional view of an example of a plate with a printed layer according to the present invention.
Each of FIG. 2A
Figure 1B:
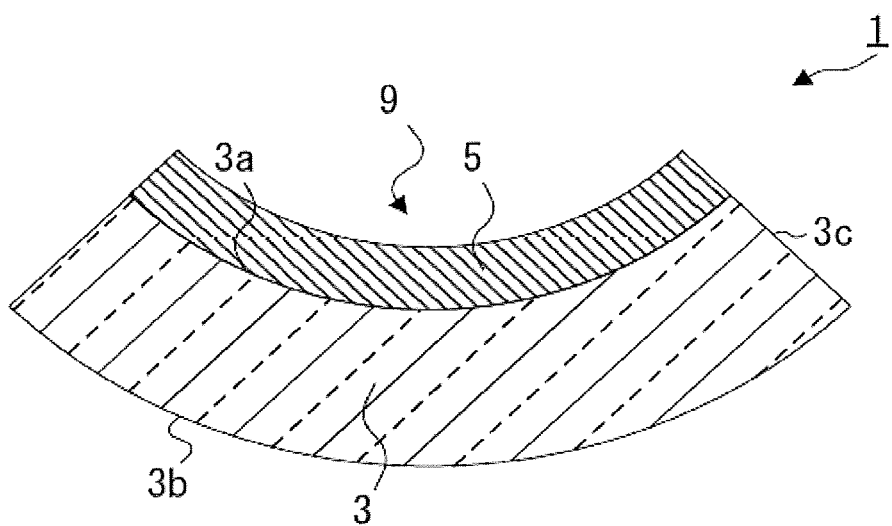

The plate with a printed layer obtained by the present invention contains a plate and a printed layer formed on the plate, and each of FIG. 1A and FIG. 1B is a schematic cross-sectional view illustrating an example of the plate with a printed layer obtained by the present invention.

The plate 1 with a printed layer in this example contains a bent plate 3 with a bent portion 9 and a printed layer 5 formed on the bent plate 3.

The plate in the present invention refers to a plate with a large area as compared with the thickness, may be not only a flat plate but also a bent plate, and may have unevenness on the surface. Also, the plate may have an antiglare-treated layer, an antireflection-treated layer, a conductive layer, or the like provided in advance. The present invention has an advantage that a uniform printed layer can be formed even if a non-conductive plate is used as the plate, in particular.

<Non-Conductive Plate>

The non-conductive plate is typically a plate made of a material with a volume resistivity value of 1 Ωm or larger at 20° C. Examples of the material include glass, resin, silicon, wood, and paper. Examples of the resin include polyethylene terephthalate, polycarbonate, triacetyl cellulose, and methyl polymethacrylate. Glass is preferable in view of safety and strength. Furthermore, in the case where the plate with a printed layer according to the present invention is used as an in-vehicle member, glass is preferable also in view of high heat resistance and high weather resistance. The present invention has an advantage that it is possible to perform uniform printing on an insulated plate such as glass, resin, wood, or the like with a high insulation property with a volume resistivity value of $2\times10^5$ Ωm or larger at 20° C.

In the case where the bent plate 3 (non-conductive plate) is glass, strengthening treatment is preferably performed thereon. In this manner, in the case where the plate with a printed layer according to the present invention is used as, for example, a cover glass for an in-vehicle display device, it is possible to secure necessary mechanical durability and scratch resistance. Although it is possible to use both physical strengthening treatment and chemical strengthening treatment as the strengthening treatment, the chemical strengthening treatment is preferable since it is also possible to perform the strengthening treatment on relatively thin glass.

Examples of a kind of glass in the case where no chemical strengthening treatment is performed include alkali-free glass and soda-lime glass, and examples thereof in the case where chemical strengthening treatment is performed include soda-lime glass, soda-lime silicate glass, aluminosilicate glass, borate glass, lithium aluminosilicate glass, and borosilicate glass. Aluminosilicate glass is preferable since it is possible to obtain glass with high strength and large stress tends to be imparted by the strengthening treatment even if the thickness is thin, and since the obtained article is suitable for being arranged on a visible side of an image display device.

[Glass Composition]

Specific examples of a glass composition include the following conditions (i) to (v) as a composition represented by mol % on the basis of oxides. Also, for example, "containing 0 to 25% of MgO" means that MgO is not essential but may be contained up to 25%. The glass (ii) is included in soda-lime silicate glass, and glass (iii) and glass (iv) is included in aluminosilicate glass.

(i) Glass containing 50 to 80% of $SiO_2$, 0.1 to 25% of $Al_2O_3$, 3 to 30% of $Li_2O+Na_2O+K_2O$, 0 to 25% of MgO, 0 to 25% of CaO, and 0 to 5% of $ZrO_2$.

(ii) Glass containing 63 to 73% of $SiO_2$, 0.1 to 5.2% of $Al_2O_3$, 10 to 16% of $Na_2O$, 0 to 1.5% of $K_2O$, 0 to 5% of $Li_2O$, 5 to 13% of MgO, and 4 to 10% of CaO.

(iii) Glass containing 50 to 74% of $SiO_2$, 1 to 10% of $Al_2O_3$, 6 to 14% of $Na_2O$, 3 to 11% of $K_2O$, 0 to 5% of $Li_2O$, 2 to 15% of MgO, 0 to 6% of CaO, and 0 to 5% of $ZrO_2$, in which total content of $SiO_2$ and $Al_2O_3$ is 75% or less, total content of $Na_2O$ and $K_2O$ is from 12 to 25%, and total content of MgO and CaO is from 7 to 15%.

(iv) Glass containing 68 to 80% of $SiO_2$, 4 to 10% of $Al_2O_3$, 5 to 15% of $Na_2O$, 0 to 1% of $K_2O$, 0 to 5% of $Li_2O$, 4 to 15% of MgO, and 0 to 1% of $ZrO_2$.

(v) Glass containing 67 to 75% of $SiO_2$, 0 to 4% of $Al_2O_3$, 7 to 15% of $Na_2O$, 1 to 9% of $K_2O$, 0 to 5% of $Li_2O$, 6 to 14% of MgO, and 0 to 1.5% of $ZrO_2$, in which total content of $SiO_2$ and $Al_2O_3$ is from 71 to 75%, total content of $Na_2O$ and $K_2O$ is from 12 to 20%, and content of CaO, if any, is less than 1%.

The thickness t of the glass is preferably 0.5 mm or larger and 5 mm or smaller. Glass with a thickness of this lower limit value or larger makes it possible to provide a bent plate 3 having high strength and satisfactory texture. The thickness t of the glass is more preferably 0.7 mm or larger and 3 mm or smaller, and is further preferably 1 mm or larger and 3 mm or smaller.

The glass with the above-mentioned compositions (i) to (v) is suitable for the printing method according to the present invention. The glass with the above-mentioned compositions has a relative permittivity at 1 MHz of 10 or lower, and thus, it tends not to be charged. A printing material charged with static electricity is used in the present invention. If the printing material is continuously charged after arriving at a bent plate 3 (non-conductive plate) on which a printed layer is to be formed, it takes a long time to form a desired printed layer since the printing material repels a printing material before arrival. Thus, the printed material arriving at the bent plate 3 (non-conductive plate) is necessary discharged electricity quickly after arrival. In the case of the glass with the above-mentioned compositions having a relative permittivity at 1 MHz of 10 or lower, it is possible to perform uniform printing even on a shape with a complicated bent portion by the method according to the present invention and thus, a uniform plate 1 with a printed layer can be effectively obtained. The relative permittivity at 1 MHz is preferably 9 or lower, and is further preferably 8.5 or lower. Among the above-mentioned compositions, (i) is preferably used, and (iii) is more preferably used. Although there is no restriction for a lower limit value of the relative permittivity at 1 MHz in particular, the lower limit value is preferably 5 or larger, and is more preferably 6 or larger.

In order to appropriately perform chemical strengthening treatment, the glass preferably has a total content of $Li_2O$ and $Na_2O$ in the glass composition of 12 mol % or more. Since a glass transition point decreases to make a glass formation easy as the content of $Li_2O$ in the glass composition increases, the content of $Li_2O$ is preferably 0.5 mol % or more, more preferably 1 mol % or more, and further preferably 2 mol % or more. Furthermore, the glass composition preferably contains 60 mol % or more of $SiO_2$ and 8 mol % or more of $Al_2O_3$, in order to increase surface compression stress (Compressive Stress: hereinafter, also abbreviated as CS) and a depth of the compression stress layer (Depth of Layer: hereinafter, also abbreviated as a DOL).

The glass preferably has a maximum value of CS of 400 MPa or larger, more preferably 500 MPa or larger, and further preferably 600 MPa or larger. DOL is preferably 10 μm or larger. In this manner, by setting CS and DOL within the range, it is possible to impart excellent strength and scratch resistance to a glass main surface. DOL is preferably 20 μm or larger, and is further preferably 25 μm or larger.

[Glass Manufacturing Method]

A method for manufacturing a flat plate-shaped glass will be described. First, raw materials of the respective constituents are blended so as to obtain the aforementioned composition, and the blended raw materials are heated and melted in a glass melting furnace. The glass is homogenized by bubbling, stirring, addition of a clarifier, or the like, and a glass plate with a predetermined thickness is produced by a known forming method and is gradually cooled. Examples of the glass producing method include a float method, a press method, a fusion method, a down-draw method, and a roll-out method. The float method that is suitable for mass production is preferable in particular. Continuous producing methods other than the float method, such as a fusion method and a down-draw method, are also preferable. The glass plate produced into a flat plate shape by an arbitrary producing method is cut into a desired size after gradually cooling, to provide a flat plate-shaped glass. In a case where more accurate dimensional precision is needed or the like, polishing working or end surface working, which will be described later, may be performed on the glass plate after the cutting. In this manner, it is possible to reduce cracking and chipping in handling in the forming step or the like and to improve a yield.

<Bent Plate (Non-Conductive Plate) With Bent Portion>

Figure 2A:
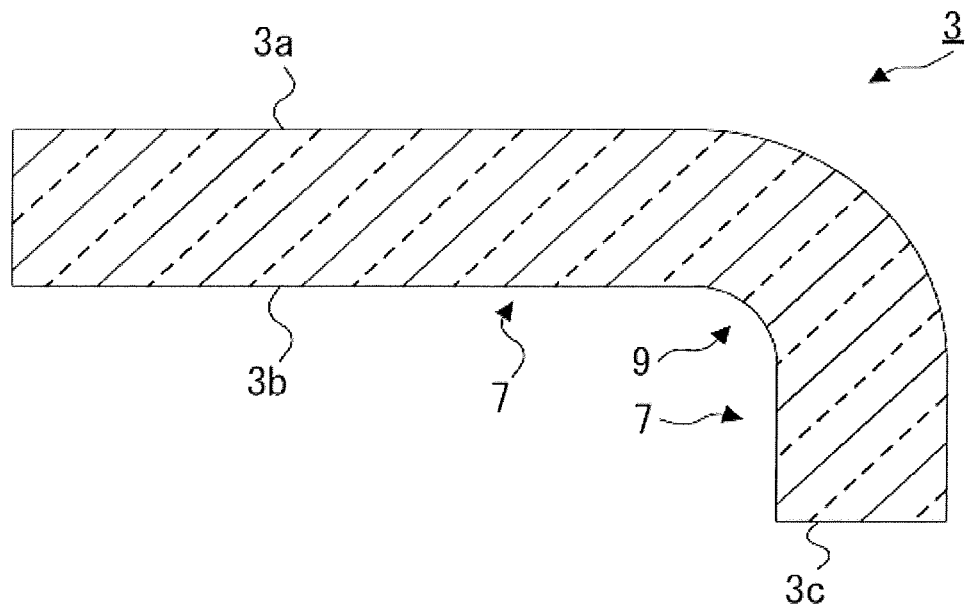
FIG. 2A is an example having a shape as a combination of a bent portion and a flat portion.
Figure 2B:
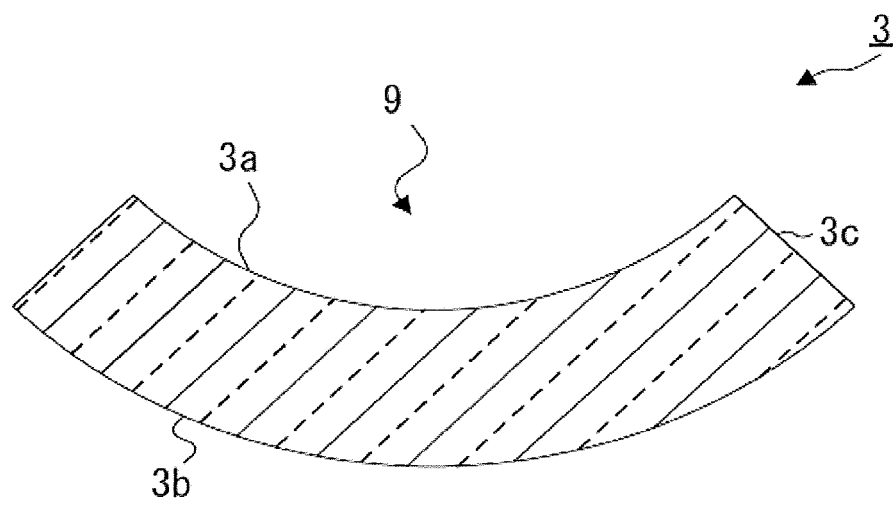
FIG. 2B is a schematic cross-sectional view of an example of a bent plate (non-conductive plate) with a bent portion, where

Each of FIG. 2A and FIG. 2B illustrates a schematic cross-sectional view of an example of a bent plate (non-conductive plate) with a bent portion. The bent plate 3 has a shape including a first main surface 3a, a second main surface 3b and an end surface 3c, and having at least one or more bent portions 9. The shape that has a combination of a bent portion 9 and a flat portion 7 as illustrated in FIG. 2A, the shape that forms a bent portion 9 as a whole as illustrated in FIG. 2B and the like are exemplified. The shape is not particularly limited as long as the bent portion 9 is provided. Recently, in the case where the bent plate 3 is used as a cover glass of display devices, assumed are various devices (televisions, personal computers, smart phones, car navigation systems, etc.) in which a display surface of a display panel such as a liquid crystal panel or an organic EL panel is a curved surface. In the case of a cover glass used in an in-vehicle display in particular, assumed is a cover glass with a complicated shape in order to effectively utilize a space around a driver seat. In such a case, the bent plate 3 may be produced in accordance with the shape of the display panel, the shape of a casing of the display device, and the like.

(Forming Step)

The bent plate 3 is preferably formed into a predetermined shape from a flat plate-shaped non-conductive plate. In the case where a plate glass is selected as the flat plate-shaped non-conductive plate for example, as a forming method to be used, a desired forming method may be selected among a self-weight forming method, a vacuum forming method, and a press forming method, depending on a shape of the bent plate 3 made of glass after forming (hereinafter, also simply abbreviated as bent glass).

The self-weight forming method is a method of placing the plate glass on a predetermined mold in accordance with the shape of the bent glass 3 after the forming, then softening the plate glass, bending the plate glass by gravity to accustom it to the mold, to thereby form the plate glass into a predetermined shape.

The vacuum forming method is a method of applying a differential pressure to front and back surfaces of a plate glass in a state where the plate glass is softened, bending the plate glass to accustom it to a mold, to thereby form the plate glass into a predetermined shape. In the vacuum forming method, the plate glass is placed on a predetermined lower mold in accordance with the shape of the bent glass 3 after forming, a mold such as a clamp mold is installed on the plate glass, the circumference of the plate glass is sealed, and a space between the lower mold and the plate glass is depressurized with a pump, thereby applying a differential pressure to the front and back surfaces of the plate glass. At this time, the upper surface side of the plate glass may be pressurized in an auxiliary manner.

Press forming is a method of placing a plate glass between predetermined molds (lower mold, upper mold) in accordance with the shape of the bent glass 3 after forming, applying a press load between the upper and lower molds in a state where the plate glass is softened, bending the plate glass to accustom it to the molds, to thereby form the plate glass into a predetermined shape.

Among these methods, since the vacuum forming method is excellent as a method of forming a plate glass into a predetermined shape of the bent glass 3, and since the bent glass 3 can be formed while keeping one of two main surfaces thereof away from the forming mold, it is possible to reduce uneven defects such as scratches and dents.

In addition, local heating forming method, other differential pressure forming methods that are different from the vacuum forming method, or the like can also be used. An appropriate forming method may be selected depending on the shape of the bent glass 3 after forming, or two or more forming methods may be used in combination.

Treatment for relaxing remaining stress may be performed by reheating (annealing treatment) the bent glass after forming. A plate glass with an etched layer or a coating layer obtained by wet coating or dry coating may be used as the flat plate-shaped plate glass used.

<Plate with Printed Layer>

Each of FIG. 1A and FIG. 1B illustrates a schematic cross-sectional view of a plate with a printed layer. The plate 1 with a printed layer contains the bent plate 3 (non-conductive plate) and the printed layer 5 formed on the first main surface 3a.

[Printed Layer]

The printed layer 5 is a layer provided for the purpose of decoration or hiding.

The printed layer 5 in the present invention may be formed of various printing materials (ink) depending on a purpose. Printing is performed by using electrostatic power by, for example, an electrostatic coating method which will be described later. This method makes it possible to perform uniform printing even on a non-conductive plate with a large area. Although a plurality of types of ink may be used, a single ink is preferably used in view of adhesiveness of the printed layer 5. Also, it is possible to perform uniform printing on the bent plate 3 (non-conductive plate) with a bent portion since the printing is performed by using the electrostatic power. Furthermore, it is possible to perform uniform printing on the bent plate 3 (non-conductive plate) with a complicated surface shape, on which uniform printing has not been able to be performed conventionally, such as a structure with a positive Gaussian curvature, a structure with a negative Gaussian curvature, or a twisted structure.

The printed layer 5 preferably has an average thickness of 3 μm or larger. In this manner, it is possible to obtain the printed layer 5 that is hard to see-through, which leads to a high hiding property. The average thickness of the printed layer 5 is preferably 30 μm or smaller, more preferably 20 μm or smaller, and particularly preferably 10 μm or smaller. In this manner, a stepwise difference between the bent plate 3 (non-conductive plate) and the printed layer 5 can be suppressed to be small, a void or the like tends not to remain even if a final product is assembled by attaching an adhesive layer thereto, and productivity and visibility are improved. The average thickness is an arithmetic mean of thickness values at arbitrary ten locations in the printed layer 5.

The printed layer 5 is preferably uniform in view of color tone and transmitting property of the printed layer 5, and the thickness of the entire printed layer is preferably within a range of the average thickness ±30%. According to conventional methods, the thickness of the printed layer significantly varies between the bent portion and the flat portion, and uniformity is not sufficient. In typical screen printing, for example, the variation in the thickness is controlled within a range of the average thickness ±50%, a further variation in the printed layer occurs due to attaching a plurality of printed layers, and uniformity cannot be secured. According to the present invention, it is possible to perform printing so that the thickness of the entire printed layer is within a range of the average thickness ±30% by using the electrostatic power regardless of the bent portion and the flat portion.

The printed layer 5 preferably has an OD value in visible light being 4 or more, and more preferably 5 or more. In a case of using the plate with such a printed layer as a cover glass, light leaking from a back light disposed on a back surface of a liquid crystal panel can be blocked, and the screen can easily be recognized. In a case of being used as a cover glass for an in-vehicle display, screen visibility from a driver is particularly important. It is possible to secure high contrast in an image by minimizing leakage of light from unnecessary sites, to help the driver's instantaneous determination.

Furthermore, in-plane uniformity of OD values is important, and an average OD value in visible light in the plane of the printed layer is preferably 4 or more. The printed layer preferably has an in-plane distribution of the OD value being within a range of the average OD value ±30%. In this manner, it is possible to obtain not only a uniform color tone but also a uniform light blocking property. The average OD value is an arithmetic mean of OD values measured at arbitrary ten locations in the printed layer 5.

The printed layer 5 preferably has an undulation on a surface thereof, in which the undulation has a diameter (true-circle equivalent) of a cross section at a height of a bearing height +0.05 μm being larger than 10 μm and 185 μm or smaller, and has a maximum height being from 0.2 μm to 10 μm when the height at a portion having the lowest height in an observation region is taken as a basis. In this manner, when a user views the printed layer 5 through the bent plate 3 (non-conductive plate), the user can recognize the printed layer 5 with an excellent appearance and a high hiding property. This is because the aforementioned undulation provided on the surface of the printed layer 5 can scatter the light from the back light behind the liquid crystal display on the surface of the printed layer 5, to suppress the light transmission. Also, when an operator attaches a display panel to the surface of the printed layer 5, a void tends not to be generated due to an adhesive used, and peeling resistance is enhanced. Furthermore, when an operator views the surface of the printed layer 5, the operator receives matte impression and satisfactory texture is obtained.

Figure 6A:
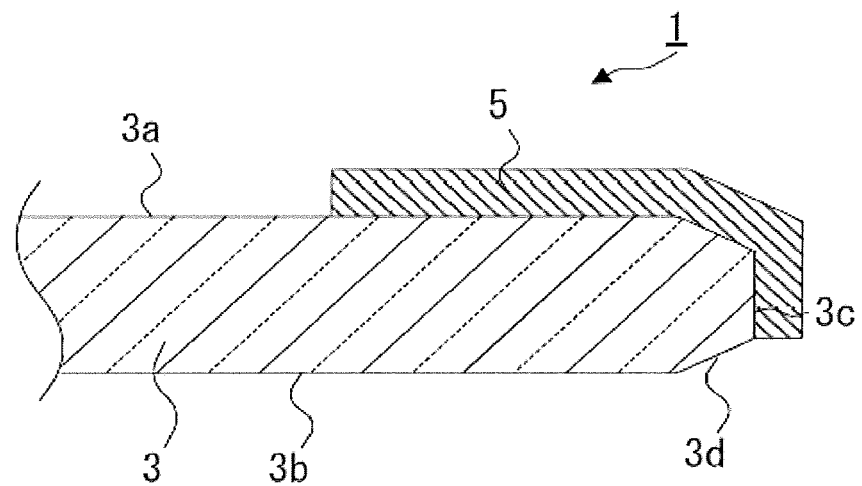
FIG. 6C is a schematic cross-sectional view of an example of a plate with a printed layer according to the present invention and is an explanatory diagram of a state of an end surface.
Figure 6B:
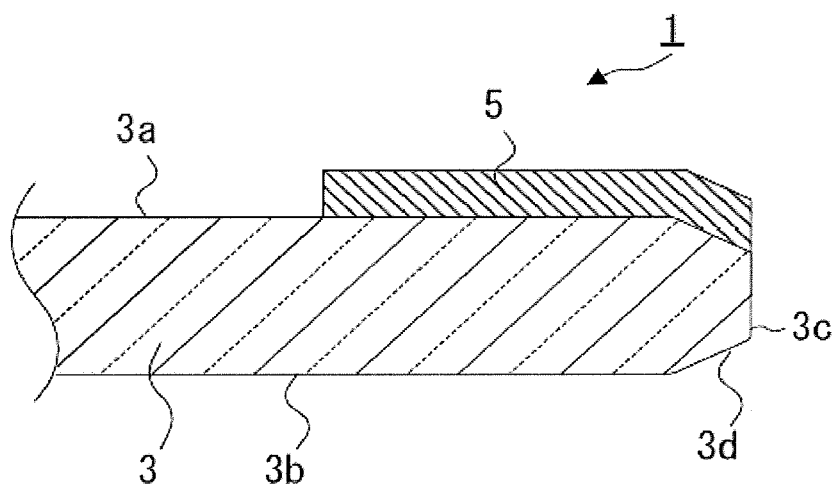
Figure 6C:
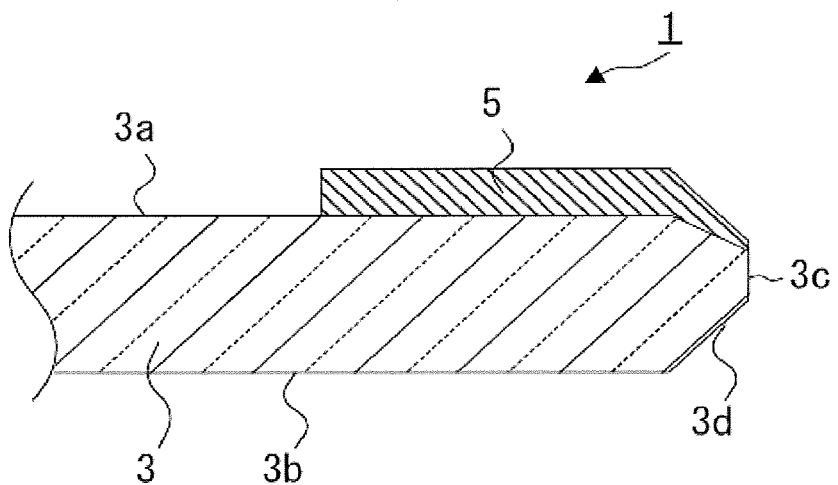

Also, it is also possible to perform uniform printing of the printed layer 5 on the end surface 3c of the bent plate 3 (non-conductive plate) as illustrated in FIG. 6A. In this manner, the light blocking property at a circumferential edge portion of the bent plate 3 (non-conductive plate) can be enhanced, and an excellent appearance of the printed layer 5 can be obtained. In the case where it is not desired to provide the printed layer 5 on the end surface 3c, the printed layer 5 may be formed by performing mask treatment with a film or the like. In such a case, the printed layer 5 is formed such that the end surface 3c of the bent plate 3 (non-conductive plate) is aligned with the end surface of the printed layer 5 in a cross-sectional view as illustrated in FIG. 6B. Since this keeps the peripheral edge portion of the bent plate 3 (non-conductive plate) clean, dimensional precision is enhanced, and excellent precision and aesthetic appearance can be achieved when it is assembled into an article. The end surface may be chamfered after forming the printed layer 5 as illustrated in FIG. 6A and FIG. 6B to obtain the plate 1 with a printed layer as illustrated in FIG. 6C depending on a situation.

The surface of the printed layer 5 is preferably smooth. For example, the arithmetic average roughness Ra is preferably from 0.5 nm to 5 μm in view of visibility, tactile impression and the like. The root-mean-square roughness Rq is preferably from 0.3 nm to 10 μm in view of non-smoothness and finger slidability. The maximum height roughness Rz is preferably from 0.5 nm to 10 μm in view of non-smoothness and finger slidability. The maximum cross-sectional height roughness Rt is preferably from 0.5 nm to 5 μm in view of non-smoothness and finger slidability. The maximum peak height roughness Rp is preferably from 0.3 nm to 5 μm in view of non-smoothness and finger slidability. The maximum valley depth roughness Rv is preferably from 0.3 nm to 5 μm in view of non-smoothness and finger slidability.

The average length roughness Rsm is preferably from 0.3 nm to 20 μm in view of non-smoothness and finger slidability. The kurtosis roughness Rku is preferably 1 or larger and 30 or smaller in view of tactile impression. The skewness roughness Rsk is preferably −1 or larger and 1 or smaller in view of uniformity in visibility, tactile impression and the like. Although these are roughness based on a roughness curve R, the roughness may be defined by undulation W or a cross-sectional curve P that occurs in a correlated manner, and there is no particular restriction.

As for the used bent plate 3 (non-conductive plate) with a bent portion, the bent portion has a curvature radius of 1,000 mm or smaller, preferably 800 mm or smaller, more preferably 500 mm or smaller, and further preferably 200 mm or smaller. It is possible to perform a uniform printing and to obtain a uniform plate 1 with a printed layer by using the printing method according to the present invention even in the case of the bent plate 3 (non-conductive plate) that has a bent portion with a small curvature radius, on which uniform printing cannot be performed conventionally. The curvature radius of the bent portion is preferably 1 mm or larger, more preferably 5 mm or larger and further preferably 10 mm or larger. In the case where the curvature radius of the bent portion is the lower limit value or larger, liquid droplets of a printing material charged with static electricity tend to uniformly land, and a more uniform printed layer can be obtained.

As for the used bent plate 3 (non-conductive plate) with a bent portion, the bent portion has a bending depth of, for example, 1,000 mm or smaller, preferably 800 mm or smaller, more preferably 500 mm or smaller, and further preferably 200 mm or smaller. In the case of the bent plate 3 (non-conductive plate) that has a bending depth of the upper limit value or smaller, it is possible to perform a uniform printing and to obtain a uniform plate 1 with a printed layer by using the printing method according to the present invention even in the case of the bent plate 3 (non-conductive plate) that has a bent portion with a deep bending, on which uniform printing cannot be performed conventionally. Although the bending depth of the bent portion is not particularly limited, the bending depth is preferably 3 mm or larger, more preferably 5 mm or larger, further preferably 10 mm or larger, and particularly preferably 20 mm or larger. It is possible to obtain a uniform plate with a printed layer by using the printing method according to the present invention for the bent plate 3 (non-conductive plate) with a bending depth that is small but the lower limit value or larger, on which uniform printing cannot be performed by a conventional screen printing method or the like.

As for the used bent plate 3 (non-conductive plate) with a bent portion, although the upper limit value of the bending angle is not particularly limited as long as it 360° or smaller, the upper limit value is preferably 270° or smaller, more preferably 180° or smaller, further preferably 135° or smaller, particularly preferably 120° or smaller, and especially preferably 90° or smaller. Although uniform printing could not be performed conventionally on the bent plate 3 (non-conductive plate) with a bent portion having such a large bending angle, it is possible to form a uniform printed layer and to obtain a uniform plate 1 with a printed layer in the present invention since the printing material is imparted electrostatic power. The lower limit value of the bending angle is preferably 30° or larger and is more preferably 45° or larger.

<Method for Manufacturing Plate with Printed Layer>

A method for manufacturing the plate 1 with a printed layer includes a coating film formation step, and depending on a situation, the manufacturing method may further include a masking formation step of forming a masking on the non-conductive plate before the coating film formation step, a coating film stabilization step after the coating film formation step, and/or a masking removal step of removing the masking after the coating film stabilization step.

(Coating Film Formation Step)

The coating film formation step includes a process of forming a coating film on the bent plate 3 (non-conductive plate) with a coating solution obtained by mixing the printing material for forming the printed layer 5 with a solvent and the like. Application of the coating solution to the bent plate 3 (non-conductive plate) is not particularly limited as long as the application method utilizes electrostatic power to charge the coating solution. For example, an electrostatic coating apparatus can be used, and in particular, an electrostatic coating apparatus that has an electrostatic coating gun provided with a rotation atomization head is preferably used. In this manner, the coating film of the coating solution is formed on the bent plate 3 (non-conductive plate).

Figure 3:
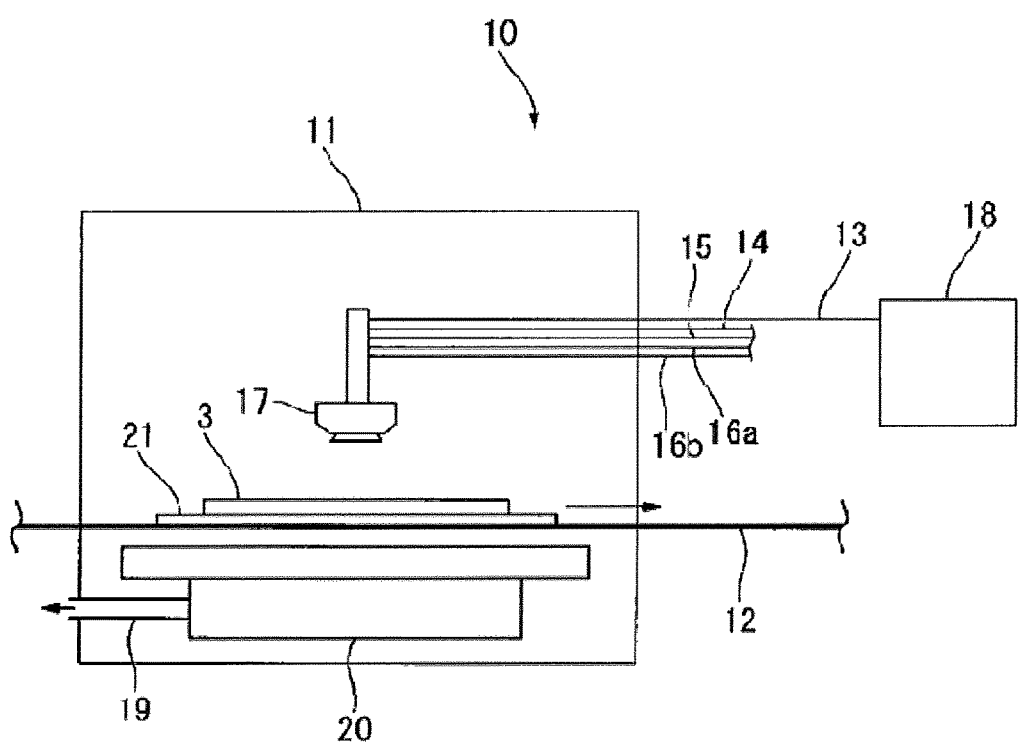
FIG. 3 is an outline view illustrating an example of an electrostatic coating apparatus.

Electrostatic Coating Apparatus:

FIG. 3 is an outline view illustrating an example of an electrostatic coating apparatus.

An electrostatic coating apparatus 10 contains a coating booth 11, a chain conveyer 12, at least one electrostatic coating gun 17, a high-voltage generation device 18, and an exhaust box 20.

The chain conveyer 12 penetrates through the coating booth 11 and transports a conductive platform (conductive base material) 21 and the bent plate 3 placed thereon (a non-conductive plate with a bent portion in FIG. 4) in a predetermined direction. The plurality of electrostatic coating guns 17 are aligned in a direction intersecting a transporting direction of the bent plate 3 (non-conductive plate) in the coating booth 11 above the chain conveyer 12, and a high-voltage cable 13, a coating solution supply line 14, a coating solution collection line 15, and two air supply lines 16a and 16b are connected to each of the electrostatic coating guns 17. The high-voltage generation device 18 is connected to the electrostatic coating guns 17 via the high-voltage cable 13 and is grounded. The exhaust box 20 is arranged below the electrostatic coating guns 17 and the chain conveyer 12, and an exhaust duct 19 is connected thereto.

The electrostatic coating gun 17 is fixed to a nozzle set frame (omitted in the drawing). In the case of performing printing on the bent plate 3 (non-conductive plate), it is possible to adjust, by the nozzle set frame, a distance from nozzle tip end of the electrostatic coating gun 17 to the bent plate 3 (non-conductive plate), an angle of the electrostatic coating gun 17 with respect to the bent plate 3 (non-conductive plate), a direction in which the at least one electrostatic coating gun 17 is aligned with respect to the transporting direction of the bent plate 3 (non-conductive plate), and the like. Since a high voltage is applied to the nozzle tip end portion of the electrostatic coating gun 17, the coating solution supply line 14 and the collection line 15, connecting portions between the electrostatic coating gun 17, the supply line 14 and the collection line 15, and portions made of metal (e.g., metal portions such as a nozzle set frame and a portion penetrating through a side wall of the coating booth 11) are insulated with resin or the like. The electrostatic coating gun 17 may be moved to follow the bent plate 3 (non-conductive plate). For example, the electrostatic coating gun 17 may be, for example, fixed to an arm tip end portion of a robot or fixed to a reciprocator.

The chain conveyer 12 is formed of, for example, a plurality of plastic chains, and a part or an entirety of the plurality of plastic chains is conductive plastic chains. The conductive plastic chains are grounded via a metal chain (omitted in the drawing) to which the plastic chain is fitted and a ground cable (omitted in the drawing) of a drive motor (omitted in the drawing) thereof.

The chain conveyer 12 may be made of metal and is a plurality of metal chains, for example. The metal is preferably a material with durability against the coating solution and is stainless steel (SUS), for example. The metal chains are grounded via a ground cable (omitted in the drawing) of a drive motor (omitted in the drawing) thereof.

The conductive platform 21 is a platform that has conductivity imparted at least on a surface on which the bent plate 3 (non-conductive plate) can be placed, and is used for sufficient grounding the bent plate 3 (non-conductive plate) via the conductive plastic chains of the chain conveyer 12, the metal chains and the ground cable of the drive motor. It is possible to form a uniform coating film even on the non-conductive plate by using the conductive platform 21. The conductive platform 21 is not necessarily in direct contact with the chain conveyer as long as the conductive platform 21 is grounded, and for example, the conductive platform 21 may be placed on a square pipe. Even in the case of bent plate 3, when it is sufficiently grounded, the coating solution uniformly adheres thereto and a uniform coating film can be formed.

Although the material of the conductive platform 21 is not particularly limited, metal, carbon, and conductive resin are preferable in order to impart conductivity. In order to efficiently deliver heat from a heat source, metal and carbon are more preferable. In order to prevent scratch from being formed on the bent plate 3 (non-conductive plate), a carbon with small Vickers hardness is further preferable. It is also possible to use an article obtained by covering an insulating platform such as glass with a metal film such as aluminum foil or an article coated with metal such as copper by vapor deposition as the conductive platform 21. In particular, it is possible to selectively form the coating film at a desired position without forming a masking material, by arranging the conductive platform 21 only along a site at which the printed layer 5 is to be formed.

As the conductive platform 21, a conductive platform 21 having a surface that is brought into contact with the entire second main surface 3b of the bent plate 3 (non-conductive plate) is preferable since such a conductive platform 21 can suppress a temperature drop of the bent plate 3 (non-conductive plate), can achieve uniform temperature distribution, and can secure electric uniformity so as to be able to uniformly apply the coating solution even to the bent plate 3. Although the conductive platform 21 may be a flexible film material, preferred is a platform with a surface worked in advance so as to be brought into contact with the entire second main surface 3b of the target bent plate 3 (non-conductive plate). Although the second main surface 3b of the bent plate 3 (non-conductive plate) and the surface of the conductive platform 21 are not necessarily brought into complete contact with each other, it is preferable to bring the surfaces into uniform contact to a maximum extent in order to form a uniform coating film on the first main surface 3a. The conductive platform 21 that has a contact surface with the same area as that of the second main surface 3b of the bent plate 3 (non-conductive plate) may be used. In order to more efficiently impart electric uniformity to the bent plate 3 (non-conductive plate), the conductive platform 21 that is brought into contact with the entire second main surface 3b of the bent plate 3 (non-conductive plate) and has a contact surface with a larger area than that of the second main surface 3b is preferable.

The electrostatic coating apparatus and the electrostatic coating guns are not limited to those in the illustrated example. The electrostatic coating apparatus is preferably provided with an electrostatic coating gun including a so-called rotation atomization head, and a known electrostatic coating apparatus can be employed. Also, the electrostatic coating gun may spray the coating solution while being gripped by a six-axis coating robot (e.g., manufactured by Kawasaki Robotics, Inc.), for example.

Coating Method:

The coating solution is applied to the bent plate (non-conductive plate) by the electrostatic coating apparatus 10 as follows.

Figure 4:
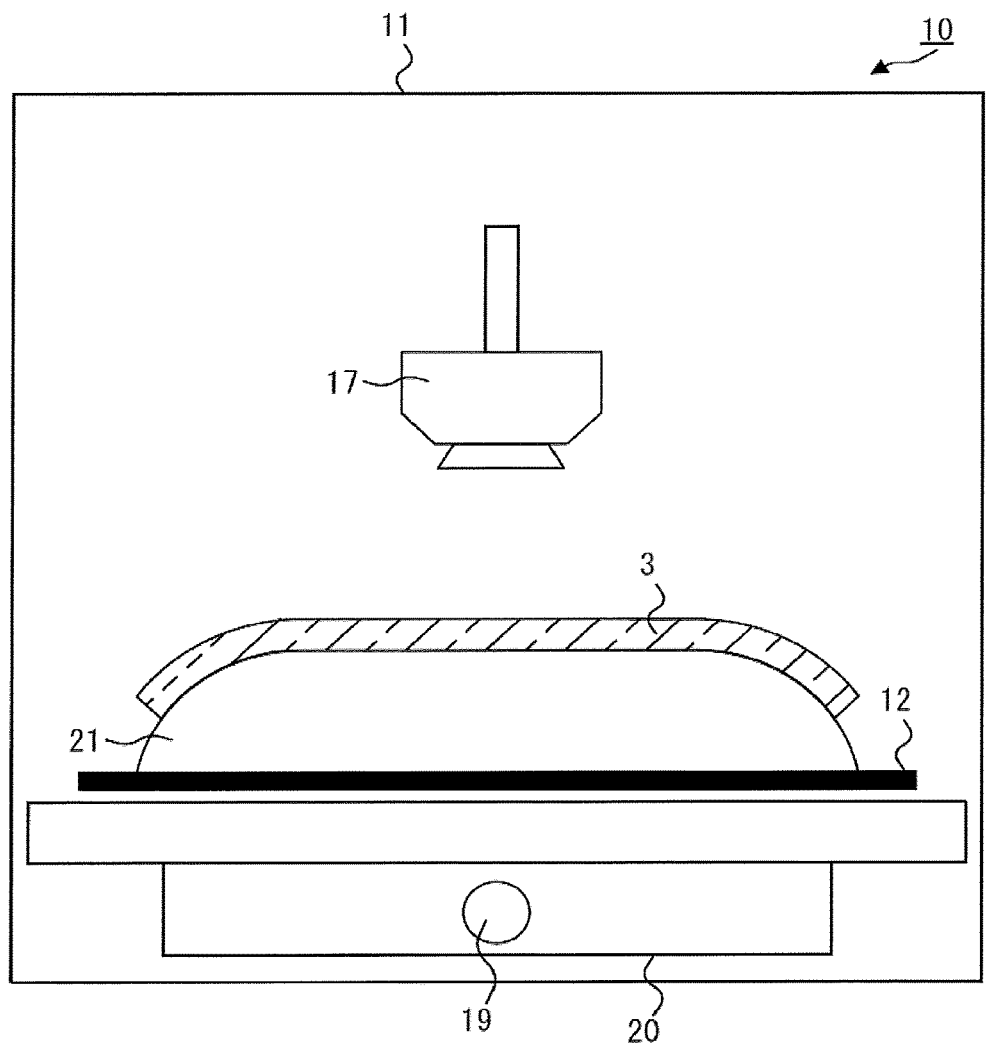
FIG. 4 is a schematic side view of the electrostatic coating apparatus of FIG. 3 when viewed from an upstream side of a chain conveyer.

As illustrated in FIG. 3 and FIG. 4, the bent plate 3 is placed on the conductive platform 21. A high voltage is applied to the electrostatic coating gun 17 by the high-voltage generation device 18. At the same time, the coating solution is supplied from the coating solution supply line 14 to the electrostatic coating gun 17, and air is supplied to the electrostatic coating gun 17 from each of the two air supply lines 16a and 16b.

The air supplied from the air supply line 16b is blown out from an outlet opening of the electrostatic coating gun 17 as shaving air.

The air supplied from the air supply line 16a drives an air turbine motor, which is not illustrated in the drawings, in the gun main body and rotates a rotation shaft which is not illustrated in the drawings. In this manner, the coating solution which has been supplied from the coating solution supply line 14 to the inside of the electrostatic coating gun 17 is atomized, forms liquid droplets, and radially flies.

The liquid droplets of the coating solution which have flown from the electrostatic coating gun 17 are guided in the direction toward the bent plate 3 by a flow of the shaving air. Also, the liquid droplets are charged with negative electric charge and are drawn by electrostatic attraction force toward the grounded bent plate 3. Therefore, the coating solution efficiently adheres to the surface of the bent plate 3, a coating film uniform and homogenous in both the bent portion and the flat portion can be formed, and a uniform printed layer 5 can be obtained.

The coating solution that has not been sprayed from the electrostatic coating gun 17 is collected in a coating solution tank (omitted in the drawings) through the collection line 15. Also, the coating solution that has been sprayed from the electrostatic coating gun 17 and has not adhered to the bent plate 3 is suctioned into the exhaust box 20 and is collected through the exhaust duct 19.

The coating solution used for the electrostatic coating preferably has a viscosity of 0.1 Pa·s or less, more preferably from 0.01 to 0.1 Pa·s, and further preferably from 0.015 to 0.06 Pa·s. This is because the viscosity in the aforementioned range is advantageous for the atomization of the liquid droplets during the electrostatic coating and quality of the printed layer is improved. The viscosity can be measured in accordance with the method of JIS Z 8803:2011, and the measured value at 25° C. is employed.

The coating solution used for the electrostatic coating preferably has a surface tension of from 0.01 to 0.1 N/m, more preferably from 0.01 to 0.08 N/m, and further preferably from 0.02 to 0.08 N/m. This is because the surface tension in the aforementioned range is advantageous for the atomization of the liquid droplets during the electrostatic coating and quality of the printed layer is improved. The surface tension can be measured in accordance with the Wilhelmy method, and the measured value at 25° C. is employed.

The coating solution contains the printing material dispersed in or diluted with a solvent, and the concentration of the printing material in the coating solution is preferably from 10 to 70% by mass, and is preferably from 20 to 50% by mass. This is because the concentration in the aforementioned range is advantageous for the atomization of the liquid droplets during the electrostatic coating and quality of the printed layer is improved.

Although the surface temperature of the bent plate 3 (non-conductive plate) is not particularly limited, the surface temperature is preferably from 15 to 50° C., and is more preferably from 20 to 40° C. In the case where the surface temperature of the bent plate 3 (non-conductive plate) is within the aforementioned range, satisfactory adhesiveness is obtained between the bent plate 3 (non-conductive plate) and the printed layer 5, and a further fine printed layer 5 can be obtained.

The transport speed of the bent plate 3 (non-conductive plate) is preferably from 0.6 to 20 m/minute, and is more preferably from 1 to 15 m/minute. In the case where the transport speed of the bent plate 3 (non-conductive plate) is 0.6 m/minute or higher, productivity is improved. In the case where the transport speed is 20 m/minute or lower, the film thickness of the printed layer 5 formed on the bent plate 3 (non-conductive plate) can be easily controlled.

The number of times the bent plate 3 (non-conductive plate) is transported, that is, the number of times the bent plate 3 (non-conductive plate) is made to pass under the electrostatic coating gun 17 and the coating solution is applied thereto can be appropriately set depending on desired haze, glossiness and the like. The number of times is 1 or more, and is preferably 2 or more in view of a light blocking property and a hiding property. The number of times is preferably 10 or less and more preferably 8 or less, in view of productivity.

The distance from the nozzle tip end of the electrostatic coating gun 17 to the bent plate 3 (non-conductive plate) is appropriately adjusted depending on the width of the bent plate 3 (non-conductive plate), the film thickness of the printed layer 5 formed on the bent plate 3 (non-conductive plate), and the like, and is preferably from 150 to 450 mm in general. Although coating efficiency is enhanced by reducing the distance to the bent plate 3 (non-conductive plate), there is a high possibility of electric discharge and a safety problem may occur if the distance is excessively short. In contrast, although a coated region increases as the distance to the bent plate 3 (non-conductive plate) becomes longer, there is a problem of a decrease in coating efficiency if the distance is excessively long.

The voltage applied to the electrostatic coating gun 17 is adjusted depending on the amount of the coating solution applied to the bent plate 3 (non-conductive plate) and the like, and is preferably from −30 to −90 kV, more preferably from −40 to −90 kV and further preferably from −50 to −90 kV. Coating efficiency is enhanced as an absolute value of the voltage increases.

The amount of the coating solution supplied to the electrostatic coating gun 17 (hereinafter, also referred to as the amount of the coating solution) is adjusted depending on the amount of the coating solution applied to the bent plate 3 (non-conductive plate) and the like, and is preferably from 3 to 200 mL/minute, more preferably from 5 to 100 mL/minute and further preferably from 10 to 60 mL/minute. There is a concern that the excessively small amount of the coating solution leads to unevenness in printing. As the maximum amount of the coating solution, an optimal value can be selected depending on the thickness of the coated film, the coating speed, properties of the liquid, and the like.

The pressure of the air supplied from each of the two air supply lines 16a and 16b to the electrostatic coating gun 17 is appropriately adjusted depending on the amount of the coating solution applied to the bent plate 3 (non-conductive plate) and the like, and is preferably from 0.01 to 0.5 MPa. A coating pattern with the coating solution can be controlled by the pressure of the air supplied from each of the two air supply lines 16a and 16b to the electrostatic coating gun 17.

The coating pattern with the coating solution means a pattern formed by the liquid droplets of the coating solution sprayed from the electrostatic coating gun 17 on the bent plate 3 (non-conductive plate).

If the pressure of the air supplied to the air turbine motor in the electrostatic coating gun 17 is raised, the rotation speed of the rotation shaft increases to increase the rotation speed of the rotation atomization head, thereby reducing the size of the liquid droplets that fly from the rotation atomization head, which leads to a tendency that the coating pattern is enlarged.

If the pressure of the air supplied to air supply path in the electrostatic coating gun 17 is raised to increase the pressure of the air (shaving air) blown out from the outlet, spreading of the liquid droplets that fly from the rotation atomization head is suppressed, and the coating pattern tends to be small.

The pressure of the air to be supplied to the air turbine motor is preferably set to such a pressure that the rotation speed of the rotation atomization head (hereinafter, also referred to as a number of cup rotation) is within a range from 5,000 to 80,000 rpm. The number of cup rotation is more preferably from 7,000 to 70,000 rpm, and is particularly preferably from 7,000 to 30,000 rpm. In the case where the number of cup rotation is the lower limit value or more, an excellent surface unevenness forming ability is achieved. In the case where the number of cup rotation is the upper limit value or less, excellent coating efficiency is achieved.

The number of cup rotation can be measured by accessary measuring instrument (omitted in the drawings) of the electrostatic coating apparatus 10.

The pressure of the air to be supplied to the air supply paths is preferably set to such a pressure that the pressure of the shaving air (hereinafter, also referred to as a shaving pressure) is within a range from 0.01 to 0.3 MPa. The shaving pressure is more preferably from 0.03 to 0.25 MPa, and is particularly preferably from 0.05 to 0.2 MPa. In the case where the shaving pressure is the lower limit value or higher, an excellent improvement in coating efficiency is achieved by an improvement in the effect of preventing the liquid droplets from flying. In the case where the shaving pressure is the upper limit value or lower, a coating width can be secured.

(Coating Film Stabilization Step)

In the coating film stabilization step, stabilization treatment, such as drying, is performed on the coating film formed on the base material in the coating film formation step to obtain the printed layer 5. The drying may be performed at the same time with the coating with the coating solution by heating the bent plate 3 (non-conductive plate), or the bent plate 3 (non-conductive plate) may be heated after the bent plate 3 (non-conductive plate) is coated with the coating solution. The drying temperature is preferably 40° C. or higher, and is more preferably 50° or higher and 300° C. or lower. Although the drying time is not particularly limited, the drying time is preferably 5 minutes or longer and 60 minutes or shorter, and more preferably 10 minutes or longer and 30 minutes or shorter in view of takt time. Stabilization treatment may be performed by UV irradiation depending on the printing material.

(Masking Formation Step)

In the masking formation step, a predetermined pattern is formed on the surface of the bent plate 3 (non-conductive plate) by a masking formation material. The masking formation material used may be a UV curable resin, a thermosetting resin, or any of inorganic and organic printing materials. In the case of using a printing material as the masking formation material, the printing material is required to have characteristics that are different from those of the printing material used in the coating film formation step. In the case where the printing material used in the coating film formation step is not a water-soluble material, for example, the masking formation material is preferably water soluble. Alternatively, preferred is a masking formation material that sublimes at a significantly lower temperature than the sublimation temperature of the printing material used in the coating film formation step. Excessively high viscosity of the masking formation material tends to cause cracking while excessively low viscosity thereof tends to cause bleeding. Therefore, it is preferable to employ appropriate viscosity in order to form a fine pattern by the masking formation material. The viscosity is preferably from 1 Pa·s to 100 Pa·s at 25° C., for example.

In the masking formation step, a technology of screen printing, inkjet printing, pad printing, film transfer printing, or the like is utilized.

In the screen printing, a screen with a pattern formed thereon is arranged on an upper surface of the bent plate 3 (non-conductive plate) while determining a horizontal position thereof, and a squeegee is made to pass across while extruding the masking formation material supplied to the upper surface of the screen, to thereby form a masking on the bent plate 3 (non-conductive plate). In the case where the screen is formed by fixing an outer circumference of a flexible sheet-shaped screen is fixed with a rigid frame, the screen is preferably used in a case of forming a plane-shaped pattern on a relatively flat plane of the bent plate 3 (non-conductive plate).

The inkjet printing is a method of forming dot pattern on the bent plate 3 (non-conductive plate) by ejecting minute liquid droplets of the masking formation material in a liquid form from a nozzle in a pulse manner. The bent plate 3 (non-conductive plate) is positioned with reference to an origin of a nozzle moving mechanism, and the nozzle moves in a substantially horizontal direction above the plane of the bent plate 3 (non-conductive plate) while ejecting minute liquid droplets of the masking formation material based on a command from a computer. In this manner, dot-shaped masking is continuously formed, and masking in a predetermined pattern is finally formed. In the case of the bent plate 3 (non-conductive plate) with a bent portion that has a relatively steep surface to be printed, the distance between the nozzle that ejects the liquid droplets of the masking formation material and the bent plate 3 (non-conductive plate) is preferably substantially constant in consideration of distortion of the pattern and the like. That is, it is preferable to use a mechanism of rotating and moving the nozzle in accordance with the pattern while maintaining the distance between the nozzle and the bent plate 3 (non-conductive plate) to be substantially constant.

The pad printing is a method in which the bent plate 3 (non-conductive plate) is positioned and fixed with reference to an origin of a pad moving mechanism and a predetermined pattern formed on a printing plate surface is transferred to the bent plate 3 (non-conductive plate) by using a pad which is an elastic body. The pad is brought into contact with the printing plate, thereby transferring the predetermined pattern formed in advance on the printing plate to the pad surface. Then, the pad is brought into contact with the surface to be printed of the bent plate 3 (non-conductive plate) to transfer the pattern on the pad surface to the bent plate 3 (non-conductive plate) to form a masking on the bent plate 3 (non-conductive plate). In the case of using a material with relatively low elasticity, such as silicon rubber, as a material of the pad, it is possible to improve a property of following the shape of the plane at the time of the transfer and to use the pad for a relatively steeply bent plate.

In the film transfer printing, masking with a predetermined pattern is formed on a film in advance, and masking is formed on the bent plate 3 (non-conductive plate) by bringing the film into contact with the surface to be printed of the bent plate 3 (non-conductive plate) to transfer the masking formed on the film to the bent plate 3 (non-conductive plate), and removing the film. A film material preferably has flexibility that can follow the shape of the surface to be printed of the bent plate 3 (non-conductive plate). For bringing the film into contact with the surface to be printed of the bent plate 3 (non-conductive plate), the film is positioned as needed. For transferring the masking to the bent plate 3 (non-conductive plate), a treatment such as pressurization by a rubber roll or heating may supplementarily be performed.

In the bent plate 3 (non-conductive plate) that has the flat portion and the bent portion, the site where the masking is to be formed may be either the flat portion or the bent portion, but the masking is preferably formed on the flat portion in the case where the masking formation step is performed by screen printing, inkjet printing, or film transfer printing.

Also, masking stabilization step may be performed on the bent plate 3 (non-conductive plate) with the pattern of the masking formation material formed thereon in order to stabilize the masking formation material. For example, heating treatment is performed by transporting the entire bent plate 3 (non-conductive plate) including the masking pattern to the inside of a heating furnace. The stabilization treatment may be performed by a method other than thermosetting depending on the masking formation material. For example, UV exposure is used in the case where the masking formation material is a UV curable resin. Furthermore, a masking end surface treatment step of working the end surface of the masking with a laser, a cutter, or the like may be performed in order to improve precision of the shape of the masking end surface.

(Masking Removal Step)

In the masking removal step, elution to a solvent, sublimation or melting by heating, mechanical peeling, or the like can be utilized, and the process is appropriately selected depending on a combination of physical properties of the masking formation material and the printing material.

In the method of eluting the masking to a solvent, the bent plate 3 (non-conductive plate) is dipped into the solvent, allowed to stand for a predetermined period, and washed with water to perform rinsing treatment on the bent plate 3 (non-conductive plate) In the process of dipping and washing, the solvent may be stirred as needed. The solvent used is selected from water, an organic solvent and the like depending on the type of the masking formation material, and is required not to react with the printing material of the printed layer and not to dissolve the printing material of the printed layer.

In the method of causing sublimation by heating, it is preferable that the bent plate 3 (non-conductive plate) is arranged at an interval from an adjacent the bent plate 3 (non-conductive plate) (e.g., the bent plate 3 (non-conductive plate) adjacent in the vertical direction) in a heating furnace such as an electric furnace, temperature raising and cooling is performed at predetermined gradients, and the bent plate 3 (non-conductive plate) is extracted from the heating furnace, sufficiently cooled, and then washed with water to perform rinsing treatment on the bent plate 3 (non-conductive plate). The temperature of the heating furnace is preferably set to such a temperature at which the masking formation material can be sublimed but quality of the printing material is not changed. For the heating furnace, a scheme of capable of ventilating the inside of the furnace is preferably employed rather than a tightly closed type. Therefore, it is possible to simultaneously perform the coating film stabilization step and the masking removal step by sublimating the masking with the heat generated in the printing material drying process in the coating film stabilization step.

In the mechanical peeling, for example, the masking is mechanically removed and washed by bringing a rotating brush in contact with the bent plate 3 (non-conductive plate) while supplying washing water thereto. For the brush, it is preferable to set hardness, pressing force, the number of rotations, and the like so as not to cause scratches on the printed layer. It is not limited thereto, and film-shaped masking may be peeled off by a manual operation or by using a machine.

In consideration of surface quality after the removal of the masking, the method of eluting the masking into a solvent is desirable. In addition, washing such as water washing, solvent washing, plasma washing, corona washing, or ultrasound washing may be performed after the removal of the masking.

Modification Example

The present invention is not limited only to the aforementioned embodiment. Various improvements and changes in design can be made without departing from the gist of the present invention. Furthermore, other procedures, structures and the like may be employed as specific procedures, structures and the like for performing the present invention within a scope capable of achieving the object of the present invention.

For example, the following processes and treatment may be performed on the bent plate (non-conductive plate).
(Grinding and Polishing Working Step)

Grinding working and/or polishing working may be performed on at least one main surface of a target such as the non-conductive plate with a flat plate shape or the bent plate 3 (non-conductive plate) with a bent portion obtained after forming.

In the grinding and polishing working step, a grinding and polishing working portion of a rotating polishing tool is made to move at a constant speed while being brought into contact with a surface to be ground and/or polished with a constant pressure. It is possible to uniformly grind and/or polish the surface to be ground and/or polished at constant grinding and/or polishing rate by performing the grinding and/or polishing under the conditions of the constant pressure and the constant speed.

The pressure at the time when the grinding and polishing working portion of the rotating polishing tool is brought into contact is preferably from 1 to 1,000,000 Pa in view of economic efficiency, controllability, and the like. The speed is preferably from 1 to 10,000 mm/min in view of economic efficiency, controllability, and the like. The amount of movement is appropriately determined depending on the shape of the bent plate 3 (non-conductive plate) and the like. Although the rotating polishing tool is not particularly limited as long as the grinding and polishing working portion thereof is a rotating body capable of performing polishing, examples thereof include a spindle that has a tool chucking portion and a scheme of attaching a polishing tool to a leutor. A type of a material of the rotating polishing tool is not limited as long as at least the grinding and polishing working portion thereof can work and remove a working target, such as a cerium pad, a rubber grinding wheel, a felt buff, or polyurethane, and has a Young's modulus of preferably 7 GPa or less and further preferably 5 GPa or less. In the case where the material of the rotating polishing tool has a Young's modulus of 7 GPa or less, the grinding and polishing working portion is deformed so as to follow the shape of a target due to a pressure, and a bottom surface and a side surface can be worked to have the predetermined surface roughness described above. Examples of the shape of the grinding and polishing working portion of the rotating polishing tool include a circular or donut-like flat disk shape, a cylindrical columnar shape, a bullet shape, a disk shape, and a barrel shape.

In the case of performing the polishing while bringing the grinding and polishing working portion of the rotating polishing tool into contact with the working target, a polishing abrasive grain slurry is preferably interposed therebetween. In such a case, examples of polishing abrasive grains include silica, ceria, alundum, white alundum (WA), emery, zirconia, SiC, diamond, titanic, and germania, and the grain size thereof is preferably from 10 nm to 10 μm.

A relative moving speed of the rotating polishing tool can be selected from the range of from 1 to 10,000 mm/min as described above. The number of rotations of the grinding and polishing working portion of the rotating polishing tool is preferably from 100 to 10,000 rpm. If the number of rotations is smaller, the working rate becomes small and it takes an excessively long time to obtain desired surface roughness. If the number of rotations is larger, the working rate becomes large, the tool is severely worn away, and it becomes difficult to control the polishing in some cases.

The grinding and polishing working may be performed by relatively moving the rotating polishing tool and the working target so as to follow the shape of the working target. Any moving scheme may be employed as long as it is possible to control the amount of movement, the direction, and the speed to be constant. For example, a scheme of using a multi-axis robot or the like is exemplified.
(End Surface Working Step)

Treatment such as chamfering working may be performed on the end surface of the bent plate 3 (non-conductive plate). In the case where the bent plate 3 (non-conductive plate) is made of glass, working that is typically referred to as R chamfering or C chamfering is preferably performed by mechanical grinding, but the working may be performed by etching and is not particularly limited. Also, the bent plate 3 (non-conductive plate) with a bent portion may be obtained by performing end surface working on glass with a flat plate shape in advance and performing a forming step thereon.
(Chemical Strengthening Step)

Figure 10A:
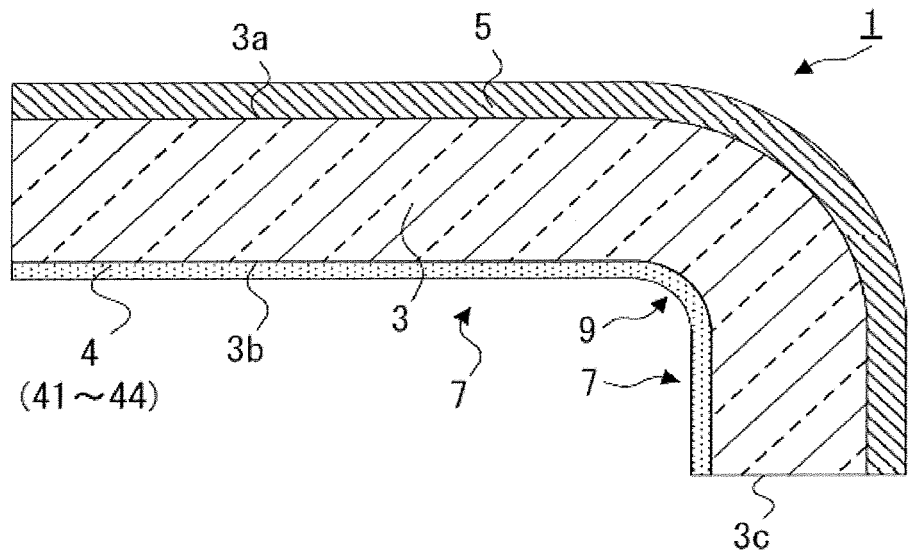
FIG. 10A is a schematic cross-sectional view of an example of a plate with a printed layer including a surface-treated layer.
Figure 10B:
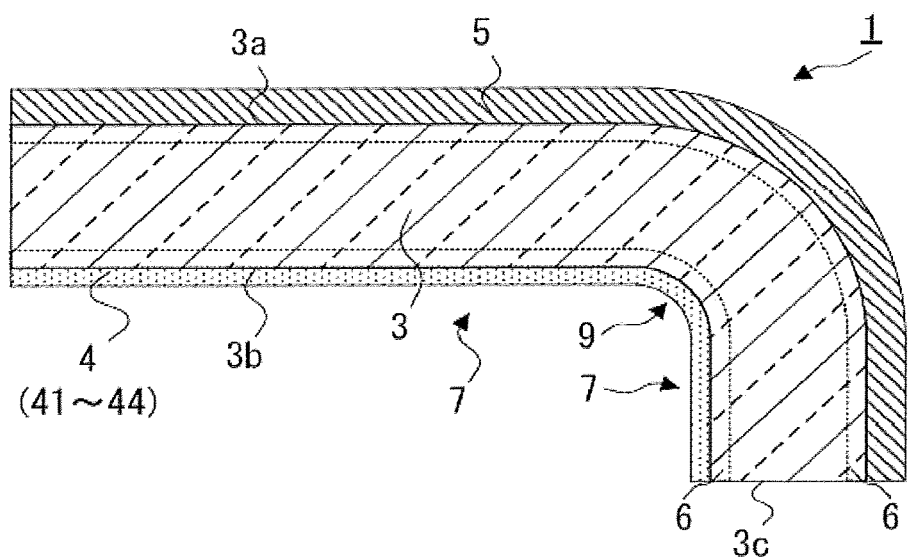
FIG. 10B is a schematic cross-sectional view of an example of a plate with a printed layer further including a compression stress layer.

In the case where the bent plate 3 (non-conductive plate) is made of glass, strength and scratch resistance thereof can be improved by forming the compression stress layer 6 on the surface thereof by chemical strengthening, as illustrated in FIG. 10B. The chemical strengthening is a treatment of forming the compression stress layer 6 on the surface of the glass by exchanging alkali metal ions (typically, Li ions and Na ions) with small ion radii on the surface of the glass with alkali metal ions (typically, Na ions for the Li ions, and K ions for the Na ions) with larger ion radii by ion exchange at a temperature of a glass transition point or lower. The chemical strengthening treatment can be performed by a conventionally known method, and typically, the glass is dipped into a potassium nitrate molten salt. The molten salt into which up to 10% by mass of potassium carbonate is added may also be used. In this manner, cracking in the surface layer of the glass can be removed, and glass with high strength can be obtained. In addition, a potassium nitrate mixed salt obtained by additionally mixing sodium nitrate or the like may be used, and water vapor, carbon dioxide gas or the like may be blown into the potassium nitrate molten salt. By mixing silver constituent such as silver nitrate in the potassium nitrate during chemical strengthening, the glass is ion-exchanged and gets silver ions on the surface thereof, and an antibacterial property is imparted thereto.
(Surface Treatment Step)

A step of forming various surface-treated layers 4 may be performed as needed in the process of producing the plate 1 with a printed layer. Examples of the surface-treated layer include an antiglare-treated layer 41, an antireflection-treated layer 42, an antifouling-treated layer 43, and an antifogging-treated layer, and these layers may be used together. Although the surface-treated layer may be formed on either the first main surface 3a or the second main surface 3b, it is preferably formed on a surface (the second main surface 3b) on which the printed layer 5 is not formed as illustrated in FIG. 10A and FIG. 10B.

[Antiglare-Treated Layer 41]

The antiglare-treated layer 41 is a layer that has an effect of mainly scattering reflected light to reduce glare of the reflected light due to unexpected appearance of a light source. The antiglare-treated layer 41 may be formed by working the surface of the bent plate 3 (non-conductive plate) itself, or may be formed by being separated deposited. As a method of forming the antiglare-treated layer 41, use can be made of, for example, a method of performing a surface treatment by a chemical or physical method on at least a part of the bent plate 3 (non-conductive plate), thereby forming an uneven shape with desired surface roughness. As another forming method, a treatment solution may be applied or sprayed to at least a part of the bent plate 3 (non-conductive plate), thereby forming an uneven structure on the plate.

Furthermore, an uneven structure may be formed on at least a part of the bent plate 3 (non-conductive plate) by a thermal method.

Specific examples of the chemical method of forming an uneven structure include a method of performing frost treatment. In the frost treatment, for example, plate glass as a target of the treatment is dipped into a mixed solution of hydrogen fluoride and ammonium fluoride, and is etched.

The physical method of forming an uneven structure is performed by, for example, so-called sandblast treatment of blowing crystalline silicon dioxide powder, silicon carbonate powder or the like onto at least one main surface of the bent plate 3 (non-conductive plate) by pressurized air, or by a method of wetting a brush, to which crystalline silicon dioxide powder, silicon carbonate powder or the like has been made to adhere, with water and polishing at least one main surface of the plate by using the brush.

In the case where the bent plate 3 (non-conductive plate) is made of glass, the frost treatment which is a chemical method can be preferably utilized, in particular, since microcracking tends not to occur in the surface of the treatment target and strength tends not to decrease.

Furthermore, etching treatment is preferably performed in order to fix the surface shape of the antiglare-treated layer 41 of the bent plate 3 (non-conductive plate), on which the method of forming an uneven structure has been performed. As the etching treatment, use can be made of a method of performing chemical etching by dipping the glass into an etching solution which is an aqueous solution of hydrogen fluoride, for example. The etching solution may contain an acid such as hydrochloric acid, nitric acid, or citric acid in addition to hydrogen fluoride. By containing such an acid in the etching solution, it is possible to suppress local occurrence of precipitates due to a reaction between cationic components such as Na ions and K ions contained in the glass and hydrogen fluoride and to cause the etching to uniformly advance in the treated plane.

In the case of performing the etching treatment, it is possible to adjust the amount of etching by adjusting concentration of the etching solution, dipping time of the glass into the etching solution and the like, and thereby, an uneven structure of the antiglare-treated layer 41 of glass can be formed and surface roughness thereof can be adjusted as desired. In the case where the formation of an uneven structure is performed by physical surface treatment such as sandblast treatment, cracking may occur. However, the cracking can be removed by the etching treatment. Also, sparkle of the glass with the uneven structure formed thereon can be suppressed by the etching treatment.

As a method of applying a treatment solution for forming an uneven structure, use can be made of a known wet coating method (a spray coating method, an electrostatic coating method, a spin coating method, a dip coating method, a die coating method, a curtain coating method, a screen coating method, an inkjet method, a flow coating method, a gravure coating method, a bar coating method, a flexo coating method, a slit coating method, or a roll coating method) and the like.

In particular, the spray coating method and the electrostatic coating method are exemplified as excellent methods of forming an uneven structure. An uneven structure can be formed by treating the bent plate 3 (non-conductive plate) with a spray apparatus by using a treatment solution, and the antiglare-treated layer 41 can be thus formed. In these methods, it is possible to provide an uneven structure to a desired site on the bent plate 3 (non-conductive plate) by using masking. The surface roughness and the like of the uneven structure can be changed in a wider range. This is because it is possible to relatively easily form the uneven shape needed to obtain required properties by freely changing the amount of the treatment solution applied and the material configuration. In the case of the bent plate 3 (non-conductive plate), the electrostatic coating method is more preferable in particular, and the antiglare-treated layer 41 can be formed homogeneous in both the flat portion and the bent portion to improve an aesthetic appearance.

On the surface opposite to the region where the printed layer 5 is formed in the bent plate 3 (non-conductive plate), the antiglare-treated layer 41 with a smaller uneven structure than that in a region where the printed layer 5 is not formed may be formed and the antiglare-treated layer 41 may not be provided thereto. In general, the printed layer 5 is formed on one surface of the bent plate 3 (non-conductive plate) by selecting a printing material with which a desired color tone can be obtained. In the case where the antiglare-treated layer 41 is formed on a region in the other surface, which corresponds to a region on which the printed layer 5 is formed, the color tone and the appearance may deviate from desired ones due to the antiglare-treated layer 41 when a user views the printed layer 5. This problem can be solved by imparting a weak antiglare property to the region in the other surface, which corresponds to the region on which the printed layer 5 is formed.

The antiglare-treated layer 41 obtained by the electrostatic coating method is preferably obtained by sintering a coating film of a composition that contains at least one of a silica precursor and particles, contains a liquid medium and further contains other constituents other than the silica precursor and the particles as needed. In the case where the composition contains the silica precursor, a matrix of the antiglare-treated layer 41 includes a matrix that includes silica derived from the silica precursor as a main constituent. The antiglare-treated layer 41 may be formed of the particles. The antiglare-treated layer 41 may be dispersion of particles in a matrix. The composition preferably contains a liquid medium having a boiling point of 150° C. or lower as the liquid medium. The content of the liquid medium having a boiling point of 150° C. or lower is preferably 86% by mass or more with respect to the entire amount of the liquid medium.

The antiglare-treated layer 41 preferably has a 60° specular glossiness of 15% or more and 140% or less, and more preferably 40% or more and 130% or less. The 60° specular glossiness of the antiglare-treated layer 41 is an index of the antiglare effect, and in the case where the 60° specular glossiness is 140% or less, the antiglare effect can be sufficiently realized.

The surface of the antiglare-treated layer 41 preferably has an arithmetic average roughness Ra of 0.03 μm or larger, more preferably from 0.05 μm to 0.7 μm, and further preferably from 0.07 μm to 0.5 μm. In the case where Ra is the lower limit value or larger, the antiglare effect can be sufficiently realized. In the case where Ra is the upper limit value or smaller, a decrease in contrast of the image can be sufficiently suppressed.

The surface of the antiglare-treated layer 41 preferably has a maximum height roughness Rz of from 0.2 μm to 5 μm, more preferably from 0.3 μm to 4.5 μm, and further preferably from 0.5 μm to 4 μm. In the case where Rz is the lower limit value or larger, the antiglare effect can be sufficiently realized. In the case where Rz is the upper limit value or smaller, the decrease in contrast of the image can be suppressed.

In addition, the surface of the antiglare-treated layer 41 preferably has, for example, a root-mean-square roughness Rq of from 0.03 μm to 5 μm in view of non-smoothness and finger slidability; a maximum cross-sectional height roughness Rt of preferably from 0.05 μm to 5 μm in view of non-smoothness and finger slidability; a maximum peak height roughness Rp of preferably from 0.03 μm to 5 μm in view of non-smoothness and finger slidability; a maximum valley depth roughness Rv of preferably from 0.03 μm to 5 μm in view of non-smoothness and finger slidability; an average length roughness Rsm on preferably from 0.03 μm to 10 μm in view of non-smoothness and finger slidability; a kurtosis roughness Rku of preferably from 1 to 3 in view of tactile impression; and a skewness roughness Rsk of preferably from −1 to 1 in view of uniformity of visibility, tactile impression and the like. Although these are roughness based on a roughness curve R, the roughness may be defined by undulation W or a cross-sectional curve P in correlation therewith, and there is no particular restriction.

In the plate 1 with a printed layer, a site at which the printed layer 5 is not provided (hereinafter, referred to as a non-printed layer part) in the flat portion 7 of the bent plate 3 (non-conductive plate) has a haze of preferably from 0.1% to 50%, more preferably from 0.1% to 30%, and further preferably from 0.1% to 20%. In the case where the haze is 0.1% or larger, the antiglare effect can be realized. In the case where the haze is 50% or smaller, a decrease in contrast of the image can be sufficiently suppressed when the plate 1 with a printed layer is provided on a visible side of a display device main body as a protective plate or a filter of various kinds.

The non-printed layer part in the bent portion 9 has a haze of preferably from 0.1% to 50%, more preferably from 0.1% to 30%, and further preferably from 0.1% to 20%. In the case where the haze is 0.1% or larger, the antiglare effect can be achieved. In the case where the haze is 50% or smaller, a decrease in contrast of the image can be sufficiently suppressed when the plate 1 with a printed layer is provided on a visible side of a display device main body as a protective plate or a filter of various kinds.

In the case where the plate 1 with a printed layer is the bent plate 3 that has the flat portion 7 and the bent portion 9 as illustrated in FIG. 1A, a ratio of the reflected image diffusion index value Rr in the non-printed part (the reflected image diffusion index value Rr in the non-printed part of the bent portion 9/a sum of reflected image diffusion index values Rr in the respective non-printed parts of the flat portion 7 and the bent portion 9) is preferably from 0.3 to 0.8. Within this range, when viewing the plate 1 with a printed layer from the user side, the user can recognize such that homogenous antiglare treatment has been done and an excellent aesthetic appearance can be achieved. Also, touch feeling of the unevenness of the antiglare-treated layer 41 is not impaired. The ratio of the reflected image diffusion index value Rr is preferably from 0.4 to 0.7, and is more preferably from 0.4 to 0.6. In a case of an antiglare-treated layer with high haze, a white tone is strengthened due to scattering of light, shade tends to appear, and visual uniformity of the appearance is affected. In the case where the ratio of the reflected image diffusion index value Rr is within the aforementioned range, visual uniformity of the appearance tends not to be affected by shade, and an excellent appearance can be obtained.

The non-printed layer part has an in-plane standard deviation of a haze being preferably from 0 to 10%, and more preferably from 0 to 6%. Within this range, when viewing the plate 1 with a printed layer from the user side, the user can recognize such that the antiglare-treated layer 41 is homogenous and an excellent aesthetic appearance can be achieved. Also, touch feeling of the unevenness of the antiglare layer is not impaired.

The non-printed layer part has an in-plane standard deviation of a sparkle index value S being preferably from 0 to 10%, and more preferably from 0 to 6%. Within this range, the display screen can be recognized with no uncomfortable feeling.

The non-printed layer part has an in-plane standard deviation of a resolution index value T being preferably from 0 to 10%, and more preferably from 0 to 6%. Within this range, the display screen can be recognized with no uncomfortable feeling.

The non-printed layer part has an in-plane standard deviation of a 60° specular glossiness being preferably from 0 to 20%, and more preferably from 0 to 15%. Within this range, the display screen can be recognized with no uncomfortable feeling of glossiness.

[Antireflection-Treated Layer 42]

The antireflection-treated layer 42 is a layer that has an effect of reducing reflection, reduces glare due to unexpected appearance of light, and in a case of being used in a display device, can improve transmittance of light from the display device and can improve visibility of the display device.

In the case where the antireflection-treated layer 42 is an antireflection film, it is preferably formed on the first main surface 3a or the second main surface 3b, but there is no restriction. The configuration of the antireflection film is not limited as long as light reflection can be suppressed, and for example, a configuration in which a high refractive index layer with a refractive index of 1.9 or larger at a wavelength of 550 nm and a low refractive index layer with a refractive index of 1.6 or smaller are laminated, or a configuration including a layer that contains hollow particles or pores made to present together in a film matrix and has a refractive index of from 1.2 to 1.4 at a wavelength of 550 nm can be employed.

Although the film configuration of the high refractive index layer and the low refractive index layer in the antireflection film may be in a form including one layer each of these two types of layers, a configuration including two or more layers each may be employed. In the case of including two or more layers each of the high refractive index layers and the low refractive index layers, a form in which the high refractive index layers and the low refractive index layers are alternately laminated is preferable. Alternatively, a configuration of including only one low refractive index layer, specifically, a configuration of including pore portions or hollow particles in the film, a configuration in which the refractive index of the matrix is 1.4 or smaller at a wavelength of 550 nm, or a configuration of an arbitrary combination thereof may be employed.

In order to improve the antireflection property, the antireflection film is preferably a laminated body in which a plurality of layers are laminated, and it is possible to realize optical design of a film configuration that expresses a lower reflection property in a wider wavelength range as the number of laminated layers increases. For example, the total number of the layers in the laminated body is preferably 2 or more and 8 or less, and the range of 2 or more and 6 or less is preferable in view of the effect of reducing reflectance and mass productivity. Here, the total number of the high refractive index layers and the low refractive index layers in the laminated body is preferably within the above range.

Materials of the high refractive index layers and the low refractive index layers are not particularly limited and can be appropriately selected in consideration of a required degree of the antireflection property, productivity, and the like. As a material forming the high refractive index layers, for example, one or more kinds selected from niobium oxide ($Nb_2O_5$), titanium oxide ($TiO_2$), zirconium oxide ($ZrO_2$), tantalum oxide ($Ta_2O_5$), and silicon nitride (SiN) can be preferably used. As a material forming the low refractive index layers, one or more kinds selected from silicon oxide ($SiO_2$), a material containing mixed oxides of Si and Sn, a material containing mixed oxides of Si and Zr, and a material containing mixed oxides of Si and Al can be preferably used.

In view of productivity and the refractive indexes, preferred is a configuration in which the high refractive index layer is formed of one kind selected from niobium oxide, tantalum oxide, and silicon nitride and the low refractive index layer is layer formed of silicon oxide.

Examples of a method of forming the antireflection film include a method of coating a film forming material on the bent plate 3 (non-conductive plate) or on another surface-treated layer by a spin coating method, a dip coating method, a casting method, a slit coating method, a spraying coating method, an electrostatic spray deposition method (ESD method), or the like and then performing heating treatment as needed, a method of forming on a surface of an adhering layer by a chemical vapor deposition method (CVD method), or a physical vapor deposition method (PVD method) such as a sputtering method or a PLD method.

The antireflection-treated layer 42 may not be provided on the surface opposite to the region on which the printed layer 5 is formed, of the bent plate 3 (non-conductive plate). In general, the printed layer 5 is formed on one surface of the bent plate 3 (non-conductive plate) by selecting a printing material with which a desired color tone can be obtained. In the case where the antireflection-treated layer 42 is formed on the region in the other surface, which corresponds to a region on which the printed layer 5 is formed, the color tone and the appearance may deviate from desired ones due to an interference colors by the antireflection-treated layer 42 when a user views the printed layer 5. Since this may degrade the appearance, the antireflection layer may not be formed as described above.

[Antifouling-Treated Layer 43]

The antifouling-treated layer 43 is a layer that suppresses adhesion of organic substances or inorganic substances to the surface or a layer that has an effect that if any organic substance or inorganic substance adheres to the surface, the adhesion can be easily removed by cleaning such as wiping.

In the case where the antifouling-treated layer 43 is formed as an antifouling film, it is preferably formed on the first main surface 3a and the second main surface 3b or on another surface-treated layer. The antifouling-treated layer 43 is not limited as long as an antifouling property can be imparted to the obtained plate 1 with a printed layer. In particular, the antifouling-treated layer 43 is preferably made of a fluorine-containing organic silicon compound film obtained by hydrolysis and condensation reactions of a fluorine-containing organic silicon compound.

The thickness of the antifouling-treated layer 43 is not particularly limited, and in the case where the antifouling-treated layer is made of a fluorine-containing organic silicon compound film, the film thickness is preferably from 2 to 20 nm, more preferably from 2 to 15 nm, and further preferably from 2 to 10 nm. In the case where the film thickness is 2 nm or larger, a state of being uniformly covered with the antifouling-treated layer 43 can be achieved and excellent scratch resistance can be realized. In the case where the film thickness is 20 nm or smaller, optical properties such as a haze value of the plate 1 with a printed layer are satisfactory in a state where the antifouling-treated layer 43 is formed.

Examples of a method of forming the fluorine-containing organic silicon compound film include a method of coating the surface of an adhering layer formed on the antiglare-treated layer 41 or another surface-treated layer with a composition of a silane coupling agent that has a perfluoroalyl group or a fluoroalkyl group such as a fluoroalkyl group containing a perfluoro(polyoxyalkylene) chain by a spin coating method, a dip coating method, a casting method, a slit coating method, a spray coating method, or the like and then performing heating treatment as needed; and a vacuum deposition method of performing vapor deposition of the fluorine-containing organic silicon compound to the surface of the adhering layer and then performing heating treatment as needed, and any method of forming the film may be used.

The composition for forming the film is not particularly limited as long as the composition contains the fluorine-containing hydrolyzable silicon compound and can form a film. The composition for forming the film may contain an arbitrary constituent other than the fluorine-containing hydrolyzable silicon compound or may include only the fluorine-containing hydrolyzable silicon compound. Examples of the arbitrary constituent include one that can be used within a range of not inhibiting the effects of the present invention, such as a hydrolyzable silicon compound that does not contain fluorine atoms (hereinafter, referred to as a "non-fluorine hydrolyzable silicon compound"), and a catalyst.

In blending the fluorine-containing hydrolyzable silicon compound and arbitrarily the non-fluorine hydrolyzable silicon compound in the composition for forming the film, the respective compounds may be blended in original states, or may be blended as partially hydrolyzed condensates thereof. Also, a mixture of the compounds and the partially hydrolyzed condensates may be blended in the composition for forming the film.

In the case of using a combination of two or more hydrolyzable silicon compounds, the respective compounds may be blended in the composition for forming the film in the original states, may be respectively blended as partially hydrolyzed condensates, or may be blended as a partially hydrolyzed co-condensates of the two or more compounds. A mixture of these compounds, the partially hydrolyzed condensates, and the partially hydrolyzed co-condensates may be used. However, in the case of forming the film by vacuum deposition, the partially hydrolyzed condensates and the partially hydrolyzed co-condensates used should have such a degree of polymerization that the vacuum deposition can be performed. Hereinafter, the term of the hydrolyzable silicon compound is used as a meaning including such partially hydrolyzed condensates and partially hydrolyzed co-condensates in addition to the compounds themselves.

The fluorine-containing hydrolyzable silicon compound used for forming the fluorine-containing organic silicon compound film according to the present invention is not particularly limited as long as the thus obtained fluorine-containing organic silicon compound film has antifouling properties such as water repellency and oil repellency.

Specific examples thereof include fluorine-containing hydrolyzable silicon compounds having one or more groups selected from the group consisting of a perfluoropolyether group, a perfluoroalkylene group and a perfluoroalkyl group. These groups are present as fluorine-containing organic groups that are bonded to a silicon atom in a hydrolyzable silyl group directly or via a liking group.

As commercially available fluorine-containing organic silicon compounds (fluorine-containing hydrolyzable silicon compounds) that have one or more groups selected from the group consisting of a perfluoropolyether group, a perfluoroalkylene group and a perfluoroalkyl group, KY-185 (product name, manufactured by Shin-Etsu Chemical Co., Ltd.), KY-195 (product name, manufactured by Shin-Etsu Chemical Co., Ltd.), Afluid (registered trademark) S-550 (product name, manufactured by Asahi Glass Co., Ltd.), Optool (registered trademark) DSX (product name, manufactured by Daikin Industries, Ltd.), and the like can be preferably used.

The fluorine-containing organic silicon compound film can be obtained by causing the composition for forming the film that contains such a fluorine-containing hydrolyzable silicon compound to adhere to the surface of the adhering layer, subjecting it to a reaction to form a film. In order to promote the reaction, heating treatment or humidification treatment may be performed as needed after the formation of the film. As a specific method of forming the film and reaction conditions, conventionally known methods, conditions and the like can be employed.

The uppermost surface of the antifouling-treated layer 43 formed has a coefficient of static friction of preferably 1 or less, more preferably 0.9 or less, and further preferably 0.8 or less. In the case where the coefficient of static friction is 1 or less, satisfactory finger slidability can be realized when a human finger is in contact with the uppermost surface of the plate 1 with a printed layer. Also, the bent portion of the first surface has a coefficient of dynamic friction of preferably 0.02 or less, more preferably 0.015 or less, and further preferably 0.01 or less. In the case where the coefficient of dynamic friction is 0.02 or less, satisfactory finger slidability can be realized when a human finger is in contact with the bent portion of the first surface.

The coefficient of static friction and the coefficient of dynamic friction can be measured as follows for example. In a touch angle evaluator TL201Ts manufactured by Trinity-Lab Inc., a pseudo finger contactor manufactured by the same company is placed on a site, which is to be measured, of the plate 1 with a printed layer in a state where load of 30 g is applied. This is made to move on the plate 1 with a printed layer at a speed of 10 mm/second, and the coefficient of static friction and the coefficient of dynamic friction are measured. A coefficient of friction when the contactor starts to move from a stationary state is defined as the coefficient of static friction, and a coefficient of friction when the contactor is moving is defined as the coefficient of dynamic friction.

[Other Surface-Treated Layer 44]

The plate 1 with a printed layer may include another surface-treated layer provided in at least a part thereof.

Examples of the other surface treated layer include an undercoating layer, an adhesion improving layer, a protective layer, an antifogging-treated layer, and a conductive layer. The undercoating layer functions as an alkali barrier layer, a low refractive index layer in a wide band, or a high refractive index layer. In addition, formation of a function-treated layer such as an antifogging-treated layer, function application treatment, and the like may be performed on the first main surface 3a of the bent plate 3 (non-conductive plate).

An order of the aforementioned steps is not particularly limited. Steps other than the forming step among the aforementioned steps may be omitted, or another step may be added.

In the case of using glass as the bent plate 3 (non-conductive plate), the printed layer 5 may be formed on unstrengthened bent plate 3 (non-conductive plate) after the forming, or may be formed on the bent plate 3 (non-conductive plate) strengthened after the forming.

In the former case, the strengthening treatment may be performed after the printed layer 5 is formed on the unstrengthened bent plate 3 (non-conductive plate) after the forming. Also, polishing working, end surface working, or drilling working may be performed on the main surface of the bent plate 3 (non-conductive plate) where the printed layer 5 is not formed. There is a case where a defect occurs or minute unevenness with a maximum size of about 1 µm remains on the surface of glass chemically strengthened by ion exchanging. Furthermore, in a case where force acts on the bent plate 3 (non-conductive plate), stress may concentrate on a location where the aforementioned defect or minute unevenness is present, and the plate may crack due to smaller force than theoretical strength. Therefore, the layer having the defect or minute unevenness (defect layer) that is present in the bent plate 3 (non-conductive plate) after the chemical strengthening may be removed by polishing. The aforementioned methods can be used as a polishing method. The thickness of the defect layer in a case where there is a defect is typically from 0.01 to 0.5 µm though it depends on conditions of the chemical strengthening.

In the case of performing the chemical strengthening step after the antiglare-treated layer formation step, heat generated by the chemical strengthening can be utilized not only for performing the chemical strengthening of the glass but also for heating the antiglare-treated layer 41 formed. This can promote the condensation polymerization and sintering of the antiglare-treated layer 41, and a film with high strength as well as abrasion resistance and weather resistance can be obtained. In the case of heating the antiglare-treated layer 41 in the chemical strengthening step, a higher strengthening effect can be realized when the plate with the antiglare-treated layer 41 formed thereon is dipped in a strengthening salt as compared with a case of heating the plate in the air. Although details of the mechanism of improving the strength are not clear, this is considered to be because ions such as potassium enter the film and stress is applied to the film itself by the chemical strengthening or because the weak alkaline strengthening salt promotes the condensation polymerization of the antiglare film.

In the latter case, there are no problems such as a defect which is caused in the printed layer 5 when the bent plate 3 (non-conductive plate) is treated in the former order, or occurrence of wrap of the bent plate 3 (non-conductive plate) in the strengthening process due to the present of the printed layer 5. Therefore, high productivity can be realized. The polishing working or the end surface working of the bent plate 3 (non-conductive plate) may be performed before the treatment of the printed layer 5 in the same manner as in the former case.

According to the aforementioned method for manufacturing the plate 1 with a printed layer of the present invention, it is possible to form the printed layer by atomizing the coating solution by using electrostatic power. In this manner, it is possible to form a uniform printed layer in the plane at both the bent portion and the flat portion of the bent plate 3 (non-conductive plate) and to perform uniform printing on the bent plate 3 (non-conductive plate) with a large area.

According to the method for manufacturing the plate 1 with a printed layer of the present invention, electrostatic coating guns may be used, and the size (e.g., the width) of a coating pattern is large. In the spray method using a two-fluid spray nozzle that is conventionally and widely used for forming a printed layer, for example, the maximum width of the coating pattern is about 7 mm. In contrast, the width of the coating pattern can be 350 mm, for example, by using the electrostatic coating guns. Also, it is possible to efficiently form a uniform film on the bent plate 3 (non-conductive plate) with a large area by using a plurality of electrostatic coating guns. Furthermore, it is possible to fabricate continuous processes and to efficiently produce the plate 1 with a printed layer. Also, the liquid droplets of the coating solution atomized from the electrostatic coating guns are charged with negative electric charge, and are attracted by electrostatic attraction force toward the grounded bent plate 3 (non-conductive plate). Therefore, it is possible to cause the liquid droplets to efficiently adhere to the bent plate 3 (non-conductive plate) as compared with a case where the liquid droplets are atomized without being charged.

Therefore, according to the method for manufacturing the plate 1 with a printed layer of the present invention, it is possible to reduce the number of times of coating and the amount of the coating solution applied required to form a printed layer with an arbitrary color tone, light transmitting properties and the like.

If the hiding performance of the plate 1 with a printed layer obtained by the method for manufacturing the plate 1 with a printed layer according to the present invention is compared with a hiding performance of the plate 1 with a printed layer formed by using a two-fluid spray nozzle, the plate 1 with a printed layer obtained by the manufacturing method of the present invention can further suppress variations that is visually recognized under exterior light or backlight irradiation and has a higher light blocking performance.

This is considered to be caused by a difference in depositing conditions of the coating solution. According to the studies made by the present inventors, in the spray method, the liquid droplets hit the plate and form crown shapes when the coating solution lands on the plate. At the same time, the liquid medium vaporizes and crown-shaped unevennesses are formed. In contrast, in the case of using the electrostatic coating guns, the liquid droplets relatively slowly fall on the plate and form dome shapes when landing on the plate. At the same time, the liquid medium vaporizes and dome-shaped protruding portions are formed. Such a difference in shapes is considered to affect the hiding performances. Even in the case where the bent plate 3 (non-conductive plate) has the flat portion 7 and the bent portion 9, in particular, it is possible to cause the liquid droplets to uniformly land by electrostatic force according to the electrostatic coating method and to produce a homogenous and uniform printed layer. The electrostatic coating method is excellent for performing printing on the bent portion, and a combination of using another printing method for the flat portion may also be applicable. It is can be expected to shorten cycle time by using the screen printing method for the flat portion and using the electrostatic coating method for the bent portion, for example.

The use purposes of the plate 1 with a printed layer according to the present invention are not particularly limited. Specific examples thereof include vehicle components (a headlight cover, a side mirror, a transparent front substrate, a transparent side substrate, a transparent rear substrate, an instrument panel surface, a key, a wheel, etc.), a meter, an architecture window, a show window, an architecture interior member, an architecture exterior member, displays (a laptop PC, a monitor, an LCD, a PDP, an ELD, a CRT, a PDA, etc.), an LCD color filter, a touch panel substrate, a pick-up lens, an optical lens, a lens for eyewear, a camera component, a video component, a CCD cover substrate, an optical fiber end surface, a projector component, a copy machine component, a solar battery transparent substrate (a cover glass, etc.), a mobile phone window, a backlight unit component (a light introducing plate, a cold-cathode tube, etc.), a backlight unit component liquid crystal luminance enhancing film (a prism, a semi-transmissive film, etc.), a liquid crystal luminance enhancing film, an organic EL light emitting element component, an inorganic EL light emitting element component, a fluorescent light emitting element component, an optical filter, an end surface of an optical component, an illumination lamp, an illumination cover, an amplification laser light source, a antireflection film, a polarization film, and a film for agricultural use.

The plate 1 with a printed layer according to the present invention is particularly suitable for a use purpose of an interior member of a transport mechanism. For design intended to enable visual recognition of the shape by transmitting light, high contrast can be achieved and visibility of the design can be enhanced by forming the printed layer with high hiding property according to the present invention at a site, through which the light is not intended to be transmitted, of the bent plate 3 (non-conductive plate). Also, if a display device such as a liquid crystal panel or a sensor is arranged in a region, in which the printed layer is not formed, of the plate 1 with the printed layer (referred to as a region with no printed layer), light from a backlight used in the display device or the sensor tends not to leak from the printed layer. This facilitates instantaneous determination when a driver operates the display device or the sensor, for example. Since brightness constantly changes in a transport mechanism such as a vehicle, the plate 1 with a printed layer according to the present invention is particularly suitable. The plate 1 with a printed layer according to the present invention is suitably used as an interior member for a transport mechanism in a dashboard (an instrument panel, a head-up display (HUD), a center console, etc.) or an interior member for a non-opening portion (a door, a seat, a floor, a ceiling, a handle, etc.).

<Display Device>

A display device according to the present invention includes a display panel that displays images and the plate with a printed layer according to the present invention that is provided on a visible side of the display panel. The present manufacturing method is particularly suitable for the plate with a printed layer used in an in-vehicle display device, in particular, due to a complicated shape with deep bending, such as a shape with composite bending or unevenness.

Examples of the display panel include a liquid crystal panel, an organic electroluminescence (EL) panel, and a plasma display panel.

The plate with a printed layer may be integrally provided with the display panel as a plate for protecting the display panel, or may be arranged on the visible side of the display panel as a filter of various kinds.

According to the display device as described above, satisfactory visibility can be realized since the plate with a printed layer according to the present invention that has an excellent hiding performance and appearance is provided on the visible side of the display panel.

The present application is based on Japanese Patent Application No. 2016-107709, filed on May 30, 2016, the entire content of which is incorporated herein by reference.

INDUSTRIAL APPLICABILITY

According to the present invention, it is possible to provide a plate with a printed layer that has an excellent aesthetic appearance, a uniform appearance, and an excellent hiding performance, a manufacturing method capable of manufacturing the plate with a printed layer that has an excellent aesthetic appearance, a uniform appearance, and an excellent hiding performance, and a display device provided with the plate with a printed layer.

DESCRIPTION OF REFERENCE NUMERALS AND SIGNS

1 Plate with printed layer
3 Bent plate (non-conductive plate)
3a First main surface
3b Second main surface
3c End surface
4 Surface-treated layer
5 Printed layer
6 Compression stress layer
7 Flat portion
9 Bent portion
10 Electrostatic coating apparatus
11 Coating booth
12 Chain conveyer
13 High-voltage cable
14 Coating solution supply line
15 Coating solution collection line
16a, 16b Air supply line
17 Electrostatic coating gun
18 High-voltage generation device
19 Exhaust duct
20 Exhaust box
21 Conductive platform (conductive base material)

What is claimed is:

1. A plate with a printed layer comprising:
    a bent plate with a bent portion, including a first main surface, a second main surface and an end surface, and
    a printed layer formed on the first main surface,
    wherein the printed layer has an undulation in its surface, and
    the undulation has a diameter (true-circle equivalent) of a cross section at a height of a bearing height+0.05 µm being larger than 10 µm and 185 µm or smaller, and has a maximum height being from 0.2 µm to 10 µm when the height at a portion having the lowest height in an observation region is taken as a basis.

2. The plate with a printed layer according to claim 1, wherein the printed layer has an average value (average OD value) of optical density (OD values) in visible light in a plane being 4 or more.

3. The plate with a printed layer according to claim 2, wherein the printed layer has an in-plane distribution of the OD value being within a range of the average OD value ±30%.

4. The plate with a printed layer according to claim 1, wherein the bent plate has a relative permittivity of 10 or lower.

5. The plate with a printed layer according to claim 1, wherein the bent plate has a volume resistivity value of $2 \times 10^5$ Ωm or larger at 20° C.

6. The plate with a printed layer according to claim 1, wherein the bent portion has a curvature radius of 1,000 mm or smaller.

7. The plate with a printed layer according to claim 1, wherein the printed layer is also formed on the end surface.

8. The plate with a printed layer according to claim 1, wherein the second main surface is subjected to a surface treatment.

9. The plate with a printed layer according to claim 8, wherein the surface treatment is at least one treatment selected from the group consisting of antiglare treatment, antireflection treatment, antifouling treatment, and antifogging treatment.

10. The plate with a printed layer according to claim 1, wherein a material of the bent plate is glass.

11. The plate with a printed layer according to claim 10, wherein the glass has a compression stress layer on any one of main surfaces thereof.

12. The plate with a printed layer according to claim 11, wherein the compression stress layer has a depth (DOL) of 10 µm or larger.

13. The plate with a printed layer according to claim 10, wherein the glass has a composition comprising, represented by mol % on the basis of oxides:
    50 to 80% of $SiO_2$,
    0.1 to 25% of $Al_2O_3$,
    3 to 30% of $Li_2O+Na_2O+K_2O$,
    0 to 25% of MgO,
    0 to 25% of CaO, and
    0 to 5% of $ZrO_2$.

14. The plate with a printed layer according to claim 1, wherein the bent plate further includes a flat portion.

15. The plate with a printed layer according to claim 1, wherein in a cross-sectional view in a thickness direction of the bent plate, when a distance between a line segment connecting two end portions and a tangential line that is in contact with the bent portion and in parallel with the line segment is defined as a bending depth h, the bending depth is 1,000 mm or smaller.

16. The plate with a printed layer according to claim 1, wherein the bent plate has a twisted structure with different curvature radii in a single bent portion.

17. The plate with a printed layer according to claim 1, wherein the printed layer has a thickness of 3 μm or larger.

18. The plate with a printed layer according to claim 1, wherein the printed layer has a thickness of 10 μm or smaller.

19. The plate with a printed layer according to claim 1, wherein the printed layer has a thickness being within a range of an average thickness ±30%.

20. The plate with a printed layer according to claim 14, wherein the first main surface further includes a non-printed portion with no printed layer formed thereon, and the non-printed portion has a ratio of a reflected image diffusion index value Rr obtained by Equation (1) being from 0.3 to 0.8:

Ratio of reflected image diffusion index value $Rr$= (reflected image diffusion index value $Rr$ in non-printed layer portion of bent portion)/(sum of reflected image diffusion index values $Rr$ in respective non-printed layer portions in flat portion and bent portion (1).

21. A display device comprising the plate with a printed layer according to claim 1.

22. A method for manufacturing a plate with a printed layer according to claim 1, the method comprising:
a coating film formation step of forming a coating film on a non-conductive plate including a first main surface, a second main surface and an end surface, by applying a coating solution comprising a printing material to the first main surface by using electrostatic power,
wherein in the coating film formation step, the non-conductive plate is in contact with a conductive base material and the coating solution has a viscosity of 0.1 Pa·s or less.

23. The method for manufacturing a plate with a printed layer according to claim 22, wherein the coating solution has a surface tension of from 0.01 N/m to 0.1 N/m.

24. The method for manufacturing a plate with a printed layer according to claim 22, wherein an electrostatic coating apparatus is used in the coating film formation step.

25. The method for manufacturing a plate with a printed layer according to claim 22, further comprising:
a coating film stabilization step of stabilizing the coating film.

26. The method for manufacturing a plate with a printed layer according to claim 22, further comprising:
a masking formation step of forming masking on the non-conductive plate.

27. The method for manufacturing a plate with a printed layer according claim 24, wherein the electrostatic coating apparatus has an electrostatic coating gun.

28. The method for manufacturing a plate with a printed layer according to claim 22, wherein the non-conductive plate is glass.

29. The method for manufacturing a plate with a printed layer according to claim 22, wherein the non-conductive plate includes a bent portion.

30. The method for manufacturing a plate with a printed layer according to claim 22, wherein the conductive base material has a conductivity imparted at least to a surface thereof, and the surface is in contact with the second main surface of the non-conductive plate.

31. A display device comprising a plate with a printed layer obtained by the method for manufacturing a plate with a printed layer according to claim 22.

* * * * *